United States Patent
Naskar et al.

(10) Patent No.: US 12,163,030 B2
(45) Date of Patent: Dec. 10, 2024

(54) HIGH STRENGTH LIGNIN-ACRYLONITRILE POLYMER BLEND MATERIALS

(71) Applicant: UT-Battelle, LLC, Oak Ridge, TN (US)

(72) Inventors: Amit K. Naskar, Knoxville, TN (US); Christopher C. Bowland, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 16/829,167

(22) Filed: Mar. 25, 2020

(65) Prior Publication Data
US 2020/0308411 A1 Oct. 1, 2020

Related U.S. Application Data
(60) Provisional application No. 62/823,703, filed on Mar. 26, 2019.

(51) Int. Cl.
*C08L 97/00* (2006.01)
*C08L 9/02* (2006.01)

(52) U.S. Cl.
CPC ............ *C08L 97/005* (2013.01); *C08L 9/02* (2013.01)

(58) Field of Classification Search
CPC ................................. C08L 9/02; C08L 97/005
See application file for complete search history.

(56) References Cited

U.S. PATENT DOCUMENTS

| | | | | |
|---|---|---|---|---|
| 3,167,523 | A * | 1/1965 | Dimitri | C08L 9/06 530/506 |
| 4,260,702 | A | 4/1981 | Schultz et al. | |
| 6,555,617 | B1 | 4/2003 | Tanaka et al. | |
| 9,453,129 | B2 | 9/2016 | Naskar | |
| 9,815,985 | B2 | 11/2017 | Naskar et al. | |
| 2015/0368471 | A1 * | 12/2015 | Naskar | C08K 3/38 524/72 |

(Continued)

FOREIGN PATENT DOCUMENTS
CN 106905712 A * 6/2017

OTHER PUBLICATIONS
English-language machine translation of CN-106905712-A, performed on Espacenet on Sep. 7, 2021, 11 pages.*

(Continued)

*Primary Examiner* — Peter F Godenschwager
(74) *Attorney, Agent, or Firm* — Scully, Scott, Murphy & Presser, P.C.

(57) ABSTRACT
A polymer blend material comprising: (i) a lignin component; (ii) a nitrile butadiene rubber component; and (iii) divalent or trivalent metal salt; wherein: component (i) is present in an amount of about 5 wt. % to about 95 wt. % by weight of components (i) and (ii); component (i) is dispersed in component (ii) in the form of domains having a size of up to 1000 nm; component (iii) is present in an amount of 0.1-10 wt. % by weight of components (i) and (ii); and the polymer blend material has a tensile failure strength of at least 10 MPa, and an elongation at break of at least 20%. Methods for producing the polymer blend, molded forms thereof, and articles thereof, are also described.

15 Claims, 8 Drawing Sheets

(56) References Cited

U.S. PATENT DOCUMENTS

2017/0015828 A1* 1/2017 Naskar ..................... C08L 9/06

OTHER PUBLICATIONS

Barnes, S.H., et al., "An Ionomeric Renewable Thermoplastic from Lignin-Reinforced Rubber", Macromolecular Rapid Communications, 2019, pp. 1900059 (1-6), vol. 40.

Tran, C.D., et al., "A New Class of Renewable Thermoplastics with Extraordinary Performance from Nanostructured Lignin-Elastomers", Advanced Functional Materials, 2016, pp. 2677-2685, 26(16).

Davison, B.H., et al., "Variation of S/G Ratio and Lignin Content in a Populus Family Influences the Release of Xylose by Dilute Acid Hydrolysis", Applied Biochemistry and Biotechnology, 2006, pp. 427-435, vol. 129-132.

Liu, B., et al., "Catalytic conversion of high S-lignin to a sustainable tri-epoxide polymer precursor", Green Chem., 2022, Received Apr. 2, 2022, Accepted May 13, 2022, pp. 4958-4968, 24.

Smith, R.A., et al., "Manipulation of Lignin Monomer Composition Combined with the Introduction of Monolignol Conjugate Biosynthesis Leads to Synergistic Changes in Lignin Structure", Plant Cell Physiol. (2022), Received Jul. 22, 2021, Accepted Mar. 10, 2022, pp. 744-754, 63(6).

Stewart, J.J., et al., "The Effects on Lignin Structure of Overexpression of Ferulate 5-Hydroxylase in Hybrid Poplar", Plant Physiology, Jun. 2009, pp. 621-635, vol. 150.

Weng, J.-K., et al., "Tansley review: The origin and evolution of lignin biosynthesis", New Phytologist (2010), Received Mar. 15, 2010, Accepted May 7, 2010, pp. 273-285, 187.

Zhao, Q., et al., "Syringyl lignin biosynthesis is directly regulated by a secondary cell wall master switch", PNAS, Aug. 10, 2010, pp. 14496-14501, vol. 107, No. 32.

* cited by examiner

1B

1C

1D

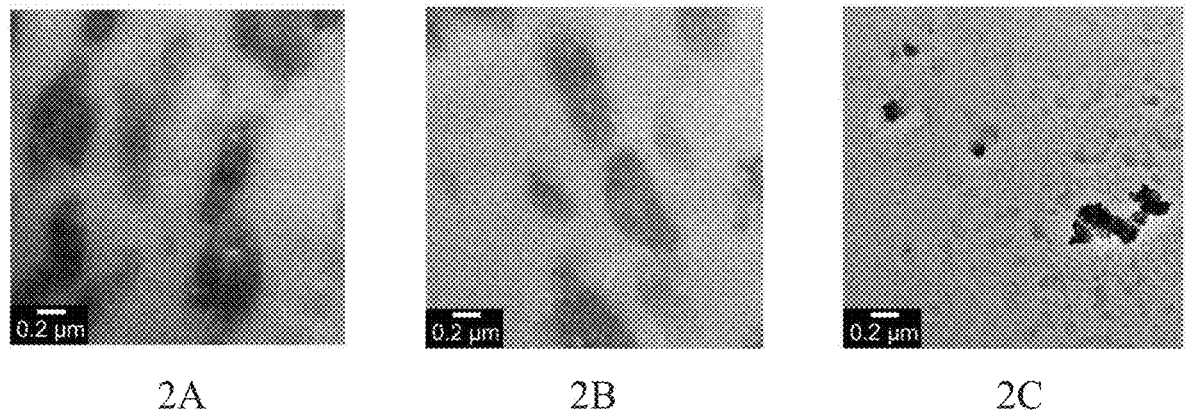
2A  2B  2C
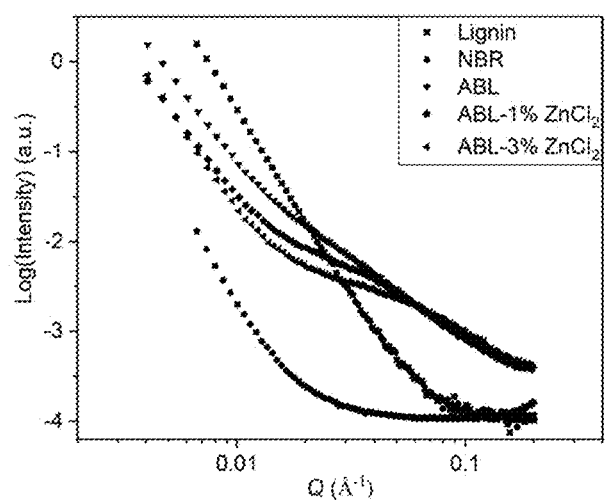
2D
FIGS. 2A-2D

3A

3B

4A

4B

4C

4D

5A

5B

5C

5D

HIGH STRENGTH LIGNIN-ACRYLONITRILE POLYMER BLEND MATERIALS

CROSS-REFERENCE TO RELATED APPLICATIONS

The present application claims benefit of U.S. Provisional Application No. 62/823,703, filed on Mar. 26, 2019, all of the contents of which are incorporated herein by reference.

GOVERNMENT SUPPORT

This invention was made with government support under Prime Contract No. DE-AC05-00OR22725 awarded by the U.S. Department of Energy. The government has certain rights in the invention.

FIELD OF THE INVENTION

The present invention relates generally to polymer blend compositions, and more particularly, to lignin-containing or acrylonitrile-containing polymer blends. The present invention is more particularly directed to such compositions having useful physical characteristics in such properties as tensile strength, elasticity, and toughness.

BACKGROUND OF THE INVENTION

Producing thermoplastic building materials from renewable feedstocks can lessen reliance on petrochemicals. However, such renewable-based materials need to be improved in performance along with reduction in cost to become commercially viable. Lignin, an amorphous aromatic material from woody and grassy biomass, is one such renewable feedstock. Lignin possesses several attractive properties, including low molecular weight, high chemical reactivity, and good melt processability, that, when used in conjunction with more conventional polymers, could lead to improved material characteristics.

Polymer blends containing lignin and nitrile butadiene rubber (NBR), also known as acrylonitrile-butadiene-lignin (ABL) blends, are known. See, for example, C. D. Tran, et al., *Advanced Functional Materials*, 2016, 26(16), 2677-2685. However, at the present time, ABL blends, particularly those containing hardwood lignin, generally do not possess sufficient mechanical properties (e.g., tensile strength) for most commercial applications. Additives, such as carbon black and boric acid, have been incorporated into ABL blends, optionally along with partial crosslinking of the rubber using peroxide, in an effort to improve the material's stiffness and strength. However, such methods generally still result in a material with less than desirable mechanical properties, along with the further drawback of the production process requiring a long mixing cycle and sequential incorporation of multiple ingredients.

SUMMARY OF THE INVENTION

In one aspect, the present disclosure is directed to ABL polymer blend compositions possessing exceptional strength and toughness, without relying on known additives, such as carbon or boric acid, or covalent crosslinking, to achieve the improvement in mechanical properties. Thus, the ABL polymer blends described herein represent a significant advance in the field of renewable-based materials, and particularly, the field of ABL polymer blend materials. As further discussed below, the improved ABL polymer blend material is achieved by incorporating a divalent or trivalent metal salt (such as a metal halide) in the polymer blend. More specifically, the polymer blend composition includes the following components: (i) a lignin component; (ii) a nitrile butadiene rubber (NBR) component; and (iii) divalent or trivalent metal salt, wherein: component (i) is present in an amount of about 5 wt. % to about 95 wt. % by weight of components (i) and (ii); component (i) is dispersed in component (ii) in the form of domains having a size of up to 1000 nm; and component (iii) is present in an amount of 0.1-10 wt. % by weight of components (i) and (ii). The foregoing polymer blend material preferably has a tensile failure strength of at least 10 MPa, and an elongation at break of at least 20%.

The polymer blends described herein are generally characterized by a combination of beneficial mechanical properties (e.g., high strength or tensile stress and moderate or high elasticity) that make them particularly useful in critical structural applications where substantial loads or mechanical stresses are encountered. Generally, the polymer blends described herein are thermoplastic, which advantageously provides a sufficient degree of moldability, elasticity, recyclability, and/or ductility to the blend. With such properties, the blend can be molded into a variety of useful shapes. In some embodiments, the polymer blends described herein exhibit characteristics of a thermoset elastomer or toughened plastic.

In a second aspect, the present disclosure is directed to a method for producing the above described polymer blend material. The method includes, at minimum, blending a mixture of the above components (i)-(iii). In the method, the role of component (iii), i.e., the divalent or trivalent metal salt, is critical in imparting the improved mechanical properties to the NBR-lignin (ABL) polymer blend material. Component (iii) has herein been found to impart superior performance to the ABL blend by ion-induced size reduction of lignin domains. As further discussed in the Examples, the effect of the divalent or trivalent metal salt in reducing the size of lignin domains is particularly pronounced in the case of sinapyl alcohol-rich (hardwood-derived) lignin. More specifically, the method includes homogeneously blending a mixture containing: (i) a lignin component; (ii) a nitrile butadiene rubber component; and (iii) divalent or trivalent metal salt, to form a blended mixture of components (i), (ii), and (iii), wherein the blending is conducted at a temperature of about 120° C. to about 220° C., at a shear rate of about 10 to 1000 s$^{-1}$, and for a time of about 5 to 120 minutes; wherein: component (i) is present in an amount of about 5 wt. % to about 95 wt. % by weight of components (i) and (ii); component (i) is dispersed in component (ii) in the form of domains having a size of up to 1000 nm; and component (iii) is present in an amount of 0.1-10 wt. % by weight of components (i) and (ii). As mentioned above, the resulting polymer blend material preferably has a tensile failure strength of at least 5 or 10 MPa, and an elongation at break of at least 20%.

Significantly, it has herein been found that compositions with smaller lignin domains (dispersed in the NBR matrix) exhibit better mechanical properties. In the specific case of a binary blend of lignin and NBR, it has also herein been found that sinapyl alcohol-rich lignin (sourced from hardwood biomass) forms larger lignin domains in an NBR matrix compared to guaiacyl alcohol-rich lignin (sourced from softwood biomass) domains in an NBR matrix. Thus, in view of the larger lignin domain size in binary blends of hardwood lignin and NBR, the mechanical properties of binary blends of hardwood lignin and NBR are generally inferior to binary blends of softwood lignin and NBR. Moreover, conventional efforts in improving the mechanical properties of blends of hardwood lignin and NBR have been largely unsuccessful since such efforts have not resulted in a significant reduction in hardwood lignin domain sizes. The preparative method described herein overcomes this long-standing obstacle in blends of hardwood lignin and NBR by finding an unexpected way to reduce the domain size of the hardwood lignin (i.e., by incorporation of a divalent or trivalent metal), thereby significantly improving the mechanical properties of the blend. Of further significance, hardwood lignin is more widely available from modern biorefineries that manufacture platform biochemicals and biofuel from cellulose. Thus, the present method advantageously makes use of abundant hardwood lignin to produce ABL blends possessing exceptional mechanical properties. Although the process is particularly beneficial to improving the properties of hardwood lignin-containing blends, the process can also improve the properties of blends containing other types of lignin, including softwood lignin.

In addition to the improved mechanical properties of the ABL blends described herein, the present invention provides additional benefits related to its use of lignin. Lignin is a byproduct of the pulp processing industry, and hence, usually considered a low-valued material. Due to its natural abundance and aromatic structure, the conversion of lignin to high-value products can help reduce dependency on fossil fuels and also reduce the carbon footprint.

Another advantage of the method described herein is that it does not require chemical functionalization of lignin for bonding with NBR prior to melt-extrusion based processing. In other words, the process can produce a polymer blend material with exceptional physical properties by melt processing of only the lignin, NBR, and divalent or trivalent metal salt (i.e., a ternary mixture) under the above-described conditions involving temperature, shear rate, processing time, acrylonitrile content, and weight ratios of components, without employing chemical functionalization of lignin for bonding with the acrylonitrile copolymer and without incorporation of a traditional modifying agent (e.g., carbon particles, silica or silicate particles, ether-containing polymer, plasticizer, or Lewis acid compound) to achieve the improved physical properties.

BRIEF DESCRIPTION OF THE FIGURES

FIGS. 2A-2C are transmission electron microscopy (TEM) images showing different lignin-aggregated domains, with FIG. 2A showing a TEM image for ABL without $ZnCl_2$ (with lignin appearing as large and darker gray domains interspersed within the NBR matrix, appearing as white); FIG. 2B showing a TEM image for ABL with 1 wt. % $ZnCl_2$ included; and FIG. 2C showing a TEM image for ABL with 3 wt. % $ZnCl_2$ included. FIG. 2D is a plot of the corresponding small angle x-ray scattering (SAXS) data for lignin, NBR, ABL, ABL with 1 wt. % $ZnCl_2$, and ABL with 3 wt. % $ZnCl_2$.

DETAILED DESCRIPTION OF THE INVENTION

Figure 1A:
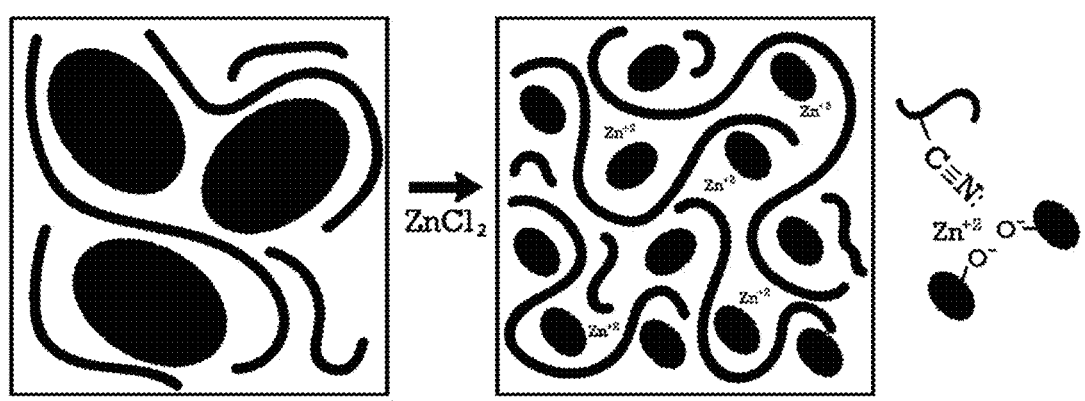
FIG. 1A is a drawing schematic depicting structural changes occurring in an NBR-lignin (ABL) polymer blend composition resulting from compounding with $ZnCl_2$. The image on the right side of the schematic shows that zinc cations ($Zn^{+2}$) can link nitrile groups of NBR with anions from phenolic or aliphatic hydroxyl groups of lignin to aid interfacial crosslinking between NBR and lignin.

In a first aspect, the present disclosure is directed to polymer blend compositions that include: (i) a lignin component; (ii) a nitrile butadiene rubber (NBR) component, and (iii) divalent or trivalent metal salt. The term "blend" (or more particularly, "polymer blend"), as used herein, refers to a solid solution in which discrete microscopic regions of components (i) and/or (ii) are present. The polymer blend may exhibit substantial integration (i.e., near homogeneous) or complete integration at the microscale or approaching the molecular level, but without losing each component's identity. Generally, component (ii) (i.e., NBR) functions as a matrix in which the lignin component (i) is dispersed.

In the polymer blend material, the lignin component is dispersed in the NBR matrix in the form of domains. Depending on the lignin type and the nitrile content in NBR, the lignin domains can be as large as 10 μm. Very large lignin domains cause deleterious effects in the mechanical properties of the blends. The smaller the lignin domains, the better the mechanical properties of the polymer blend material. In exemplary blends, the lignin domains generally have a size up to or less than 1000 nm (1 μm). In different embodiments, the lignin domains have a size up to or less than, for example, 1000 nm, 800 nm, 500 nm, 200 nm, 100 nm, 50 nm, 25 nm, 20 nm, 10 nm, 8 nm, 5 nm, 4 nm, 3 nm, 2 nm, or 1 nm, or a domain size within a range bounded by any two of the foregoing values (e.g., 1-1000 nm, 2-1000 nm, 1-100 nm, or 2-100 nm). In some embodiments, the domain size is exceptionally small. e.g., 1-10 nm, 2-10 nm, 1-8 nm, 2-8 nm, 1-5 nm, or 2-5 nm. Any of the foregoing exemplary domain sizes may alternatively represent a mean or median domain size, as found in a particle size distribution curve. For example, in some embodiments, at least 80%, 85%, 90%6, or 95% of the lignin domains have a size up to or less than any exemplary values provided above. In some embodiments, substantially all (e.g., above 95%) or all (i.e., 100%) of the lignin domains have a size up to or less than any exemplary values provided above.

The lignin component, i.e., component (i), can be any of the wide variety of lignin compositions found in nature in lignocellulosic biomass and as known in the art. As known in the art, the lignin compositions found in nature are generally not uniform. Lignin is a random copolymer that shows significant compositional variation between plant species. Many other conditions, such as environmental conditions, age, and method of processing, influence the lignin composition.

Lignins are very rich aromatic compounds containing many hydroxyl (also possible carboxylic) functional groups attached differently in both aliphatic and phenolic groups. Additionally, lignins possess highly-branched structures. These characteristics of lignins determine their corresponding physical properties. The molar mass or molecular weight ($M_w$) of the lignin is generally broadly distributed, e.g., from approximately 1000 Dalton (D) to over 10.000 D. In typical embodiments, the lignin may have a number-average or weight-average molecular weight (i.e., $M_n$ or $M_w$, respectively) of about, up to, or less than, for example, 300, 500, 1,000, 3,000, 5,000, 8,000, 10,000, 50,000, 100.000, 500.000 or 1,000,000 g/mol, or a weight within a range bounded by any two of the foregoing values, such as 500-10.000 g/mol or 500-5,000 g/mol [G. Fredheim, et al., *J. Chromatogr. A*, 2002, 942, 191.; and A. Tolbert, et al., *Biofuels, Bioproducts & Biorefining* 8(6) 836-856 (2014)] wherein the term "about" generally indicates no more than ±10%, ±5%, or ±1% from an indicated value. In some embodiments, the lignin is significantly deploymerized when isolated from native biomass source and has a molar mass of less than 1000 D. Their natural branches and low $M_w$ result in very brittle characteristics for the lignins. The aromatic structures and rich functional groups of lignins also lead to varied rigid and thermal properties. Lignins are amorphous polymers, which results in very broad glass transition temperatures ($T_g$), from ca. 80° C. to over 200° C. The glass transition temperatures are critical temperatures at which the lignin macromolecular segments become mobile. Some lignins exhibit a very good flow property (low molten viscosity), whereas others display several orders of magnitude higher viscosity.

Lignins differ mainly in the ratio of three alcohol units, i.e., p-coumaryl alcohol, guaiacyl alcohol, and sinapyl alcohol. The polymerization of p-coumaryl alcohol, coniferyl alcohol, and sinapyl alcohol forms the p-hydroxyphenyl (H), guaiacyl (G) and syringyl (S) components of the lignin polymer, respectively. The lignin can have any of a wide variety of relative weight percents (wt %) of H, G, and S components. As observed in some seeds, lignin may also consist of caffeyl alcohol units, e.g., Chen et al. *PNAS*, 109(5), 1772-1777 (2012). For example, the lignin may contain, independently for each component, at least, up to, or less than 1 wt. %, 2 wt. %, 5 wt. %, 10 wt. %, 20 wt. %, 30 wt. %, 40 wt. %, 50 wt. %, 60 wt. %, 70 wt. %, 80 wt. %, or 90 wt. %, or within a range thereof, of any of the caffeyl alcohol, H, G, and S components. Typically, the sum of the wt. % of each alcohol component is 100%, or at least 98% if other minor components are considered. Different wood and plant sources (e.g., hardwood, softwood, poplar wood, or grass-derived lignins, such as switchgrass, corn, bamboo, perennial grass, orchard grass, alfalfa, wheat, and bagasse) often widely differ in their lignin compositions, and are all considered herein as sources of lignin. In some embodiments, depending on the desired characteristics of the polymer blend material, any one or more types of lignin, as described above, may be excluded from the polymer blend material.

Besides the natural variation of lignins, there can be further compositional variation based on the manner in which the lignin has been processed. For example, the lignin can be a Kraft lignin, sulfite lignin (i.e., lignosulfonate), or a sulfur-free lignin. As known in the art, a Kraft lignin refers to lignin that results from the Kraft process. In the Kraft process, a combination of sodium hydroxide and sodium sulfide (known as "white liquor") is reacted with lignin present in biomass to form a dark-colored lignin bearing thiol groups. Kraft lignins are generally water- and solvent-insoluble materials with a high concentration of phenolic groups. They can typically be made soluble in aqueous alkaline solution. As also known in the art, sulfite lignin refers to lignin that results from the sulfite process. In the sulfite process, sulfite or bisulfite (depending on pH), along with a counterion, is reacted with lignin to form a lignin bearing sulfonate ($SO_3H$) groups. The sulfonate groups impart a substantial degree of water-solubility to the sulfite lignin.

There are several types of sulfur-free lignins known in the art, including lignin obtained from biomass conversion technologies (such as those used in ethanol production), solvent pulping (i.e., the "organosolv" process), and soda pulping. In particular, organosolv lignins are obtained by solvent extraction from a lignocellulosic source, such as chipped wood, followed by precipitation. The solvent system in organosolv delignification of biomass often include organic alcohols, such as methanol, ethanol, propanol, butanol, and isobutyl alcohol; aromatic alcohols, such as phenol and benzyl alcohol; glycols, such as ethylene glycol, triethylene glycol, propylene glycol, butylene glycol and other higher glycols; ketones, such as acetone, methyl ethyl ketone and methyl isobutyl ketone; organic acids, such as formic acid, acetic acid and propionic acid, amines, esters, diethyl ether, dioxane, glycerol, or mixture of these solvents. Typically, some degree of dilute acid pretreatment of biomass helps the delignification process. Due to the significantly milder conditions employed in producing organosolv lignins (i.e., in contrast to Kraft and sulfite processes), organosolv lignins are generally more pure, less degraded, and generally possess a narrower molecular weight distribution than Kraft and sulfite lignins. These lignins can also be thermally devolatilized to produce a variant with less aliphatic hydroxyl groups, and molecularly restructured forms with an elevated softening point. Any one or more of the foregoing types of lignins may be used (or excluded) as a component in the polyester blend.

The lignin may also be an engineered form of lignin having a specific or optimized ratio of H, G. and S components. Lignin can be engineered by, for example, transgenic and recombinant DNA methods known in the art that cause a variation in the chemical structure in lignin and overall lignin content in biomass (e.g., F. Chen, et al., *Nature Biotechnology*, 25(7), pp. 759-761 (2007) and A. M. Anterola, et al., *Phytochemistry*, 61, pp. 221-294 (2002)). The engineering of lignin is particularly directed to altering the ratio of G and S components of lignin (D. Guo, et al., The Plant Cell, 13, pp. 73-88, (January 2001). In particular, wood pulping kinetic studies show that an increase in S/G ratio significantly enhances the rate of lignin removal (L. Li, et al., *Proceedings of The National Academy of Sciences of The United States of America*, 100 (8), pp. 4939-4944 (2003)). The S units become covalently connected with two lignol monomers; on the other hand, G units can connect to three other units. Thus, an increased G content (decreasing S/G ratio) generally produces a highly branched lignin structure with more C—C bonding. In contrast, increased S content generally results in more β-aryl ether (β-O-4) linkages, which easily cleave (as compared to C—C bond) during chemical delignification, e.g., as in the Kraft pulping process. It has been shown that decreasing lignin content and altering the S/G ratio improve bioconvertability and delignification. Thus, less harsh and damaging conditions can be used for delignification (i.e., as compared to current practice using strong acid or base), which would provide a more improved lignin better suited for higher value-added applications, including manufacturing of tough polymer blends, carbon materials production (e.g., carbon fiber, carbon powder, activated carbon, microporous and mesoporous carbon) and pyrolytic or catalytic production of aromatic hydrocarbon feedstock.

Lab-scale biomass fermentations that leave a high lignin content residue have been investigated (S. D. Brown, et al., *Applied Biochemistry and Biotechnology*, 137, pp. 663-674 (2007)). These residues will contain lignin with varied molecular structure depending on the biomass source (e.g., wood species, grass, and straw). Production of value-added products from these high quality lignins would greatly improve the overall operating costs of a biorefinery. Various chemical routes have been proposed to obtain value-added products from lignin (J. E. Holladay, et al., Top Value-Added Chemicals from Biomass: Volume II—Results of Screening for Potential Candidates from Biorefinery Lignin, DOE Report, PNNL-16983 (October 2007)).

The lignin may, in some embodiments, be a crosslinked lignin that is melt-processible or amenable to melt-processing. In some embodiments, the lignin is not crosslinked. The term "crosslinked" can mean, for example, that the lignin contains methylene (i.e., —$CH_2$—) and/or ethylene (i.e., —$CH_2CH_2$—) linkages (i.e., linking groups) between phenyl ring carbon atoms in the lignin structure. By being "melt-processible" is meant that the crosslinked lignin can be melted or converted to a molten, highly viscous, or rubbery state starting at a particular glass transition temperature. The melted or highly viscous lignin can then be more easily processed, such as by mixing, molding, applying on a surface, or dissolving in a solvent. In some embodiments, the lignin is not crosslinked. In particular embodiments, the lignin component exhibits a suitable steady shear viscosity to render it as a malleable film-forming material at the processing temperature and shear rate employed. Typically, at a melt processing condition, the steady shear viscosity (e.g., at 1-100 $s^{-1}$ shear rate regime) of the lignin component is at least or above 100 Pa·s, 500 Pa·s, 1000 Pa·s, 3000 Pa·s, or 5000 Pa·s, or within a range therein. In some embodiments, the lignin may be oxidized (e.g., by exposure to a chemical oxidizing agent), while in other embodiments, the lignin is not oxidized. In some embodiments, the lignin is chemically unmodified relative to its natural extracted or isolated form. In some embodiments, the lignin is chemically modified by acetylation, oxypropylation, hydroxymethylation, epoxidation, or the like, as known in the art. In some embodiments, the lignin is plasticized with solvents or plasticizers to induce melt-processability. Solvents and plasticizers include, for example, dimethylsulfoxide, dimethylacetamide, polyoxyalkylene, and glycerol, as known in the art. In some embodiments, the use of a solvent or plasticizer is excluded.

The glass transition temperature ($T_g$) of the lignin component, which may optionally be crosslinked, is typically at least 20° C., wherein a crosslinked lignin generally possesses a higher $T_g$ than an uncrosslinked lignin. A crosslinked lignin typically possesses a $T_g$ above room temperature, e.g., 20, 25, or 30° C. In different embodiments, the lignin (either isolated lignin from biomass or a crosslinked derivative) has a glass transition temperature of precisely, about, at least, or greater than 30° C., 40° C., 50° C., 60° C., 70° C., 80° C., 90° C., 100° C., 105° C., 110° C., 115° C., 120° C., 125° C., 130° C., 140° C., 150° C., 160° C., 170° C., 180° C., 190° C., 200° C., 210° C., 220° C., 230° C., 240° C., or 250° C., or a $T_g$ within a range bounded by any two of the foregoing values. In some embodiments, the lignin does not exhibit a detectable $T_g$, unless mixed with a plasticizing component such as solvent, or polymeric additives. The polymer blend material in which the lignin is incorporated may also independently possess any of the glass transition temperatures or ranges thereof provided above, and more typically, a glass transition temperature of at least or above 15° C., 20° C., 25° C., or 30° C.

The lignin (in either raw form isolated from biomass or a crosslinked derivative) may be substantially soluble in a polar organic solvent or aqueous alkaline solution. As used herein, the term "substantially soluble" generally indicates that at least 1, 2, 5, 10, 20, 30, 40, 50, or 60 grams of the lignin completely dissolves in 1 deciliter (100 mL) of the polar organic solvent or aqueous alkaline solution. In other embodiments, the solubility is expressed as a wt. % of the lignin in solution. In some embodiments, the lignin has sufficient solubility to produce at least a 5 wt. %, 10 wt. %, 15 wt. %, 20 wt. %, 30 wt. %, 40 wt. %, or 50 wt. % solution in the polar organic solvent or aqueous alkaline solution. The polar organic solvent can be aprotic or protic. Some examples of polar aprotic solvents include the organoethers (e.g., diethyl ether, tetrahydrofuran, and dioxane), nitriles (e.g., acetonitrile, propionitrile), sulfoxides (e.g., dimethylsulfoxide), amides (e.g., dimethylformamide, N,N-dimethylacetamide), organochlorides (e.g., methylene chloride, chloroform, 1,1,-trichloroethane), ketones (e.g., acetone, 2-butanone), and dialkylcarbonates (e.g., ethylene carbonate, dimethylcarbonate, diethylcarbonate). Some examples of polar organic protic solvents include the alcohols (e.g., methanol, ethanol, isopropanol, n-butanol, t-butanol, the pentanols, hexanols, octanols, or the like), diols (e.g., ethylene glycol, diethylene glycol, triethylene glycol), and protic amines (e.g., ethylenediamine, ethanolamine, diethanolamine, and triethanolamine). The aqueous alkaline solution can be any aqueous-containing solution having a pH of at least (or over) 8, 9, 10, 11, 12, or 13. The alkalizing solute can be, for example, an alkali hydroxide (e.g., NaOH or KOH), ammonia, or ammonium hydroxide. Combinations of any of these solvents may also be used. In some embodiments, the lignin is dissolved in a solvent, such as any of the solvents described above, when used to form the polymer blend. The solvent may or may not be incorporated into the final polymer blend material. In some embodiments, one or more classes or specific types of solvents are excluded from any of the components (i) or (ii) or from the polymer blend material altogether.

The nitrile butadiene rubber (NBR) component, i.e., component (ii), also known as "nitrile rubber," is a copolymer constructed of (i.e., derived from) acrylonitrile (AN) units and butadiene (BD) units. The term "copolymer," as used herein, indicates the presence of at least AN and BD units, wherein the at least two types of units are typically present in the copolymer in random form, but in some cases may be present as blocks (i.e., segments), or in alternating, periodic, branched, or graft form. In some embodiments, the nitrile rubber contains acrylonitrile and butadiene units along with one or more other monomer units, such as one or more of styrene, divinyl benzene, isoprene, acrylate, and/or methacrylate units, provided that the nitrile rubber maintains a rubber (elastic) property if one or more other monomeric units is present. In other embodiments, the nitrile rubber contains only acrylonitrile and butadiene units.

For purposes of the invention, the nitrile rubber is a rubbery material. Being rubbery, it has a $T_g$ that is below room temperature. Because of its extended dipolar interactions, it behaves like a partially crosslinked or elastomeric material. The nitrile rubber generally possesses the known physical attributes of nitrile butadiene rubber materials of the art, such as a substantial elasticity, as generally evidenced in a typical ultimate elongation of at least 50%, 100%, 150%, 200%, 250%, 300%, 350%, 400%, 450%, or 500%. In some embodiments, the nitrile rubber component contains functionalizing groups aside from nitrile and unsaturated carbon-carbon bonds, such as carboxy, hydroxy, ester, amino, or epoxy groups. In other embodiments, one or all of such functionalizing groups are excluded from the nitrile rubber component. In some embodiments, any functionalizing groups capable of reacting with the lignin component (e.g., phenol- or hydroxy-reactive groups, such as epoxy or aldehyde groups) to form covalent bonds therewith are not present in the nitrile rubber component.

The nitrile rubber component can also have any of a wide range of weight-average molecular weights ($M_w$), such as precisely, about, at least, above, up to, or less than, for example, 2,500 g/mol, 3,000 g/mol, 5,000 g/mol, 10,000 g/mol, 50,000 g/mol, 100,000 g/mol, 150.000 g/mol, 200,000 g/mol, 300,000 g/mol, 400,000 g/mol, 500,000 g/mol, or 1,000,000 g/mol, or a molecular weight within a range bounded by any two of the foregoing exemplary values. The nitrile rubber component may also have any of a wide range of number-average molecular weights $M_n$, wherein n can correspond to any of the numbers provided above for $M_w$.

The nitrile rubber component can have any acrylonitrile content known in the art. In some embodiments, the nitrile rubber has an acrylonitrile content of at least or above 20 mol %. In different embodiments, the acrylonitrile rubber component has an acrylonitrile content of about, at least, or above 20, 25, 30, 33, 35, 38, 40, 42, 45, 48, 50, 52, or 55 mol %, or an acrylonitrile content within a range bounded by any two of the foregoing values.

In the polymer blend material, the lignin component (i) is present in an amount of at least 5 wt. % and up to about 95 wt. % by total weight of components (i) and (ii). As both components (i) and (ii) are present in the polymer blend, each component must be in an amount less than 100 wt. %. In different embodiments, the lignin component is present in the polymer blend material in an amount of about, at least, or above, for example, 5, 10, 15, 20, 25, 30, 35, 40, 45, 50, 55, 60, 65, 70, 75, 80, 90, or 95 wt. %, or in an amount within a range bounded by any two of the foregoing exemplary values, e.g., at least or above 15, 20, 25, 30, 35, or 40 wt. %, and up to 45, 50, 55, 60, 65, or 70 wt. % by total weight of components (i) and (ii). In more particular embodiments, the lignin component is present in an amount of 20, 25, 30, 35, or 40 wt. %, and up to 45, 50, 55, or 60 wt. % by total weight of components (i) and (ii), or more particularly, at least 30, 35, or 40 wt. %, and up to 45, 50, or 55 wt. % by total weight of components (i) and (ii). Typically, component (i) is present in an amount of 20-60 wt. % or 30-50 wt. % by total weight of components (i) and (ii).

The divalent or trivalent metal salt, i.e., component (iii), can be any of the known divalent or trivalent metal salts. The term "salt," as used herein, refers to any metal-containing compound or other substance in which the metal is present in ionic form and is exchangeable with other metal ions or protons ($H^+$). Ionizability of the salts and its potential towards exchangeability of the ions is key here. The salts that are not exchangeable by the lignin's deprotonated anion may not deliver the desired effects in morphology and properties. The metal salt may be, for example, a metal halide, metal oxide, metal sulfide, metal carboxylate, metal sulfate, or metal nitrate. The metal halide may be, for example, a metal fluoride, metal chloride, metal bromide, or metal iodide. The term "carboxylate," as used herein, refers to anions of the general formula R—COO$^-$, wherein R is hydrogen (in which case the carboxylate is formate) or a hydrocarbon group (e.g., alkyl, alkenyl, cycloalkyl, or aryl group) containing, for example, 1 to 30 carbon atoms. In some embodiments, R contains 1, 2, 3, 4, 5, 10, 12, 15, 18, 20, 24, or 30 carbon atoms, or a number of carbon atoms within a range bounded by any two of the foregoing values.

The metal salt is typically present in the polymer blend material in an amount of at least 0.1 wt. % and up to 10 wt. % by weight of components (i) and (ii). In different embodiments, the metal salt is present in an amount of precisely, about, or at least, for example, 0.1 wt. %, 0.2 wt. %, 0.5 wt. %, 1 wt. %, 1.5 wt. %, 2 wt. %, 2.5 wt. %, 3 wt. %, 3.5 wt. %, 4 wt. %, 4.5 wt. %, 5 wt. %, 5.5 wt. %, 6 wt. %, 6.5 wt. %, 7 wt. %, 7.5 wt. %, 8 wt. %, 8.5 wt. %, 9 wt. %, 9.5 wt. %, or 10 wt. %, or an amount within a range bounded by any two of the foregoing values, e.g., 0.1-10 wt. %, 0.1-8 wt. %, 0.1-5 wt. %, 0.1-4 wt. %, 0.1-3 wt %, 0.5-10 wt. %, 0.5-8 wt. %, 0.5-5 wt. %, 0.5-4 wt. %, or 0.5-3 wt %.

The divalent metal (i.e., +2 charged metal ion) may be, more specifically, an alkaline earth metal, main group metal, or transition metal. Some examples of alkaline earth metals include magnesium ($Mg^{+2}$), calcium ($Ca^{+2}$), strontium ($Sr^{+2}$), and barium ($Ba^{+2}$). An example of a divalent main group metal includes tin ($Sn^{+2}$). Some examples of divalent transition metals include first row transition metals, such as manganese ($Mn^{+2}$) iron ($Fe^{+2}$), cobalt ($Co^{+2}$), nickel ($Ni^+$), copper ($Cu^{+2}$), and zinc ($Zn^{-2}$), and second row transition metals, such as palladium ($Pd^{+2}$).

The trivalent metal may be, more specifically, a main group metal or transition metal. Some examples of trivalent main group metals include boron ($B^{+3}$), aluminum ($Al^{+3}$), gallium ($Ga^{+3}$), indium ($In^{+3}$), arsenic ($As^{+3}$), antimony ($Sb^{+3}$), and bismuth ($Bi^{+3}$). Some examples of trivalent transition metals include chromium ($Cr^{+3}$), iron ($Fe^{+3}$), and yttrium ($Y^{+3}$).

In a first set of embodiments, the metal salt is a divalent metal halide, such as a divalent metal fluoride, chloride, bromide, or iodide, wherein the divalent metal halide may be an alkaline earth halide, divalent main group metal halide, or divalent transition metal halide. Some examples of alkaline earth halides include magnesium fluoride ($MgF_2$), magnesium chloride ($MgCl_2$), magnesium bromide ($MgBr_2$), magnesium iodide ($MgI_2$), calcium chloride ($CaCl_2$), calcium bromide ($CaBr_2$), strontium chloride ($SrCl_2$), strontium bromide ($SrBr_2$), barium chloride ($BaCl_2$), and barium bromide ($BaBr_2$). An example of a divalent main group metal halide includes stannous chloride ($SnCl_2$). Some examples of divalent transition metal halides include manganous chloride ($MnCl_2$), manganous bromide, ferrous chloride ($FeCl_2$), ferrous bromide, cobalt (II) chloride, nickel (II) chloride, copper (II) chloride, zinc chloride ($ZnCl_2$), and zinc bromide ($ZnBr_2$).

In a second set of embodiments, the metal salt is a divalent metal oxide or sulfide, wherein the divalent metal oxide or sulfide may be an alkaline earth oxide or sulfide, divalent main group metal oxide or sulfide, or divalent transition metal oxide or sulfide. Some examples of alkaline earth oxides include magnesium oxide (MgO), calcium oxide (CaO), strontium oxide (SrO), and barium oxide (BaO). Some examples of alkaline earth sulfides include magnesium sulfide (MgS), calcium sulfide (CaS), strontium sulfide (SrS), and barium sulfide (BaS). An example of a divalent main group metal oxide or sulfide includes stannous oxide (SnO) or stannous sulfide (SnS). Some examples of divalent transition metal oxides include manganous oxide (MnO), ferrous oxide (FeO), cobaltous oxide (CoO), nickel (II) oxide, copper (II) oxide, and zinc oxide (ZnO). An example of a divalent transition metal sulfide includes zinc sulfide (ZnS).

In a third set of embodiments, the metal salt is a divalent metal carboxylate, wherein the divalent metal carboxylate may be an alkaline earth carboxylate, divalent main group metal carboxylate, or divalent transition metal carboxylate. Some examples of alkaline earth carboxylates include magnesium, calcium, strontium, and barium salts of, for example, formate, acetate, propionate, butyrate, valerate, caproate, laurate, 2-ethylhexanoate, myristate, palmitate, and stearate (e.g., magnesium formate, magnesium acetate, calcium acetate, magnesium myristate, and magnesium stearate). Some examples of divalent main group metal carboxylates include stannous acetate, stannous propionate, stannous butyrate, stannous myristate, stannous palmitate, and stannous stearate. Some examples of divalent transition metal carboxylates include manganous, ferrous, cobaltous, nickel (II), copper (II), and zinc salts of, for example, formate, acetate, propionate, butyrate, valerate, caproate, laurate, myristate, palmitate, and stearate (e.g., zinc formate, zinc acetate, zinc propionate, zinc butyrate, zinc myristate, zinc palmitate, and zinc stearate).

In a fourth set of embodiments, the metal salt is a divalent metal sulfate, wherein the divalent metal sulfate may be an alkaline earth sulfate, divalent main group metal sulfate, or divalent transition metal sulfate. Some examples of alkaline earth sulfates include magnesium sulfate, calcium sulfate, strontium sulfate, and barium sulfate. An example of a divalent main group metal sulfate includes stannous sulfate. Some examples of divalent transition metal sulfates include manganous sulfate, ferrous sulfate, cobaltous sulfate, nickel (II) sulfate, copper (II) sulfate, and zinc sulfate.

In a fifth set of embodiments, the metal salt is a divalent metal nitrate, wherein the divalent metal nitrate may be an alkaline earth nitrate, divalent main group metal nitrate, or divalent transition metal nitrate. Some examples of alkaline earth nitrates include magnesium nitrate, calcium nitrate, strontium nitrate, and barium nitrate. An example of a divalent main group metal nitrate includes stannous nitrate. Some examples of divalent transition metal nitrates include manganous nitrate, cobaltous nitrate, nickel (II) nitrate, copper (II) nitrate, and zinc nitrate.

In a sixth set of embodiments, the metal salt is a trivalent metal halide, such as a trivalent metal fluoride, chloride, bromide, or iodide, wherein the trivalent metal halide may be a trivalent main group metal halide or trivalent transition metal halide. Some examples of trivalent main group metal halides include boron chloride ($BCl_3$), aluminum chloride ($AlCl_3$), gallium chloride ($GaCl_3$), indium chloride ($InCl_3$), arsenic chloride ($AsCl_3$), antimony chloride ($SbCl_3$), and bismuth chloride ($BiCl_3$). Some examples of trivalent transition metal halides include chromium (III) chloride ($CrCl_3$), iron (III) chloride ($FeCl_3$), and yttrium chloride ($YCl_3$).

In a seventh set of embodiments, the metal salt is a trivalent metal oxide or sulfide, wherein the trivalent metal oxide or sulfide may be a trivalent main group metal oxide or sulfide or trivalent transition metal oxide or sulfide. Some examples of trivalent main group metal oxides or sulfides include boron oxide ($B_2O_3$), aluminum oxide ($Al_2O_3$), aluminum sulfide ($Al_2S_3$), gallium oxide ($Ga_2O_3$), indium oxide ($In_2O_3$), arsenic oxide ($As_2O_3$), and antimony oxide ($Sb_2O_3$). Some examples of trivalent transition metal oxides and sulfides include manganese (III) oxide ($Mn_2O_3$), chromium (III) oxide ($Cr_2O_3$), ferric oxide ($Fe_2O_3$), cobalt (III) oxide ($Co_2O_3$), and yttrium oxide ($Y_2O_3$). An example of a trivalent transition metal sulfide includes iron (III) sulfide ($Fe_2S_3$).

In an eighth set of embodiments, the metal salt is a trivalent metal carboxylate, wherein the trivalent metal carboxylate may be a trivalent main group metal carboxylate or trivalent transition metal carboxylate. Some examples of trivalent main group metal carboxylates include boron, aluminum, gallium, indium, arsenic, and antimony salts of, for example, formate, acetate, propionate, butyrate, valerate, caproate, laurate, 2-ethylhexanoate, myristate, palmitate, and stearate (e.g., aluminum acetate and aluminum myristate). Some examples of trivalent transition metal carboxylates include chromium (III) and iron (III) salts of, for example, formate, acetate, propionate, butyrate, valerate, caproate, laurate, myristate, palmitate, and stearate (e.g., chromium (III) acetate, chromium (III) myristate, iron (III) acetate, and iron (III) stearate).

In a ninth set of embodiments, the metal salt is a trivalent metal sulfate, wherein the trivalent metal sulfate may be a trivalent main group metal sulfate or trivalent transition metal sulfate. Some examples of trivalent main group metal sulfates include aluminum sulfate, gallium sulfate, indium sulfate, arsenic sulfate, antimony sulfate, and bismuth sulfate. Some examples of trivalent transition metal sulfates include chromium sulfate, iron sulfate, and yttrium sulfate.

In a tenth set of embodiments, the metal salt is a trivalent metal nitrate, wherein the trivalent metal nitrate may be a trivalent main group metal nitrate or trivalent transition metal nitrate. Some examples of trivalent main group metal nitrates include aluminum nitrate, gallium nitrate, indium nitrate, arsenic nitrate, antimony nitrate, and bismuth nitrate. Some examples of trivalent transition metal nitrates include chromium nitrate, iron nitrate, and yttrium nitrate.

In some embodiments, any one or more of the above disclosed classes or specific types of metal salts are excluded from the polymer blend. For example, in some embodiments, the metal salt contains solely divalent metal ions or solely trivalent metal ions. In other embodiments, one or more specific types or the entire class of metal oxides, or metal carboxylates, or metal sulfates, or metal nitrates may be excluded from the polymer blend. In some embodiments, the metal salt is solely a metal halide, or a specific type of metal halide, such as a divalent metal halide or trivalent metal halide, or alkaline earth metal halide, or main group metal (divalent or trivalent) halide, or transition metal (divalent or trivalent) halide, with one or more other types of metal halides excluded from the polymer blend. In yet other embodiments, monovalent (e.g., alkali) metal salts, tetravalent metal salts, pentavalent metal salts, or hexavalent metal salts may be included or excluded from the polymer blend described above containing components (i)-(iii). In some embodiments, the polymer blend contains a mixture or combination of mono-, bi-, and/or tri-valent salts.

The polymer blend material described herein may or may not include a component other than the components (i)-(iii)

described above. For example, in some embodiments, an additional agent that favorably modifies the physical properties (e.g., tensile strength, modulus, and/or elongation) may be included. The additional modifying agent may be, for example, carbon particles, silicon-containing particles (e.g., silica or silicate particles), ether-containing polymers, Lewis acid compounds (e.g., boron-containing compounds), solvents, or plasticizers. In some embodiments, one or more such modifying agents are each independently, or in total, present in an amount of up to or less than 40, 30, 20, 15, 10, 5, 4, 3, 2, or 1 wt. %. In other embodiments, one or more of the above modifying agents are excluded from the polymer blend material. In some embodiments, the polymer blend material contains no modifying agent beyond components (i)-(iii). In some embodiments, the polymer blend material contains solely components (i)-(iii).

Carbon particles, if present in the polymer blend material, can be any of the carbon particles known in the art that are composed at least partly or completely of elemental carbon, and may be conductive, semiconductive, or non-conductive. The carbon particles may be nanoparticles (e.g., at least 1, 2, 5, or 10 nm, and up to 20, 50, 100, 200, or 500 nm), microparticles (e.g., at least 1, 2, 5, or 10 μm, and up to 20, 50, 100, 200, or 500 μm), or macroparticles (e.g., above 500 μm, or at least or up to 1, 2, 5, 10, 20, 50, or 100 mm). Some examples of carbon particles include carbon black ("CB"), carbon onion ("CO"), a spherical fullerene (e.g., buckminsterfullerene, i.e., $C_{60}$, as well as any of the smaller or larger buckyballs, such as $C_{20}$ or $C_{70}$), a tubular fullerene (e.g., single-walled, double-walled, or multi-walled carbon nanotubes), carbon nanodiamonds, and carbon nanobuds, all of which have compositions and physical and electrical properties well-known in the art. As known in the art, fully graphitized carbon nanodiamonds can be considered to be carbon onions.

In some embodiments, the carbon particles are made exclusively of carbon, while in other embodiments, the carbon particles can include an amount of one or a combination of non-carbon non-hydrogen (i.e., hetero-dopant) elements, such as nitrogen, oxygen, sulfur, boron, silicon, phosphorus, or a metal, such as an alkali metal (e.g., lithium), alkaline earth metal, transition metal, main group metal (e.g., Al, Ga, or In), or rare earth metal. Some examples of binary carbon compositions include silicon carbide (SiC) and tungsten carbide (WC). The amount of hetero element can be a minor amount (e.g., up to 0.1, 0.5, 1, 2, or 5 wt. % or mol %) or a more substantial amount (e.g., about, at least, or up to 10, 15, 20, 25, 30, 40, or 50 wt. % or mol %). In some embodiments, any one or more of the specifically recited classes or specific types of carbon particles or any one or more of the specifically recited classes or specific types of hetero-dopant elements are excluded from the carbon particles.

In some embodiments, the carbon particles can be any of the high strength carbon fiber compositions known in the art. As known in the art, the carbon fiber has its length dimension longer than its width dimension. Some examples of carbon fiber compositions include those produced by the pyrolysis of polyacrylonitrile (PAN), viscose, rayon, pitch, lignin, polyolefins, as well as vapor grown carbon nanofibers, single-walled and multi-walled carbon nanotubes, any of which may or may not be heteroatom-doped, such as with nitrogen, boron, oxygen, sulfur, or phosphorus. The carbon particles may also be two-dimensional carbon materials, such as graphene, graphene oxide, or graphene nanoribbons, which may be derived from, for example, natural graphite, carbon fibers, carbon nanofibers, single walled carbon nanotubes and multi-walled carbon nanotubes. The carbon fiber typically possesses a high tensile strength, such as at least 500, 1000, 2000, 3000, 5000, 7,000, or 10,000 MPa, or higher, with a degree of stiffness generally of the order of steel or higher (e.g., 100-1000 GPa). In some embodiments, any one or more classes or specific types of the foregoing carbon particles are excluded from the polymer blend.

An ether-containing polymer, if present in the polymer blend material, can be, for example, a polyalkylene oxide (i.e., polyethylene glycol) or a copolymer thereof. Some examples of polyalkylene oxides include the polyethylene oxides, polypropylene oxides, polybutylene oxides, and copolymers thereof or with ethylene, propylene, or allyl glycidyl ether. The ether-containing polymer may also be, for example, a polyvinyl cyanoethyl ether, as described in, for example, U.S. Pat. No. 2,341,553, the contents of which are herein incorporated by reference. The ether-containing polymer may also be, for example, an etherified form of PVA, such as poly(vinyl methyl ether), which may correspond to CAS No. 9003-09-2. The ether-containing polymer may also be, for example, a phenyl ether polymer, which may be a polyphenyl ether (PPE) or polyphenylene oxide (PPO). The ether-containing polymer may also include cyclic ether groups, such as epoxide or glycidyl groups, or as further described in, for example, U.S. Pat. No. 4,260,702, the contents of which are herein incorporated by reference. The cyclic ether polymer may also be a cyclic anhydride modified polyvinyl acetal, as further described in U.S. Pat. No. 6,555,617, or a cyclic or spirocyclic polyacetal ether, as further described in, for example, A. G. Pemba, et al., *Polym. Chem.*, 5, 3214-3221 (2014), the contents of which are herein incorporated by reference. In yet other embodiments, the ether-containing polymer may be a cyclic or non-cyclic thioether-containing polymer, such as a polyphenyl thioether or polyphenylene sulfide. In some embodiments, any one or more classes or specific types of the foregoing ether-containing polymers are excluded from the polymer blend.

A Lewis acid compound, if present in the polymer blend material, can be any of the compounds known in the art having Lewis acid character, i.e., strongly electrophilic by virtue of a deficiency of electrons, other than any Lewis compounds (e.g., halides, oxides, carboxylates, sulfates, or nitrates of Group 13 elements) described above. Some examples of Lewis acid compounds that may be included in the polymer blend include boron-containing compounds (e.g., boric acid and boranes), aluminum-containing compounds (e.g., aluminum hydroxide), and tin-containing compounds (e.g., stannic acid and tin (IV) ethoxide). In some embodiments, any one or more classes or specific types of the foregoing Lewis acid compounds are excluded from the polymer blend.

A halogen-containing polymer, if present in the polymer blend material, can be any of the known halogen-containing polymers. The halogen-containing polymer typically contains halogen atoms bound to aliphatic (i.e., non-aromatic, e.g., alkyl or alkenyl) or aromatic groups. The halogen atoms can be, for example, fluorine, chlorine, and bromine atoms. Some examples of fluorinated polymers include poly(vinyl fluoride), poly(vinylidene fluoride), poly(tetrafluoroethylene), fluorinated ethylene-propylene copolymer, poly(ethylenetetrafluoroethylene), poly(perfluorosulfonic acid), and fluoroelastomers. Some examples of chlorinated polymers include poly(vinyl chloride), polyvinylidene chloride, ethylene-chlorotrifluoroethylene copolymer, polychloroprene, halogenated butyl rubbers, chlorinated polyethylene, chlorosulfonated polyethylene, chlorinated polypropylene, chlorinated ethylene-propylene copolymer, and chlorinated polyvinyl chloride. Some examples of brominated polymers include poly(vinyl bromide), and brominated flame retardants known in the art, such as brominated epoxy, poly(brominated acrylate), brominated polycarbonate, and brominated polyols.

The polymer blend material preferably possesses a tensile yield stress (i.e., "yield stress" or "tensile yield strength") of at least or above 5 MPa. In different embodiments, the tensile yield stress is at least or above 5 MPa, 8 MPa, 10 MPa, 12 MPa, 15 MPa, 20 MPa, 25 MPa, or 30 MPa, or a yield stress within a range bounded by any two of the foregoing exemplary values. As understood in the art, the term "tensile yield strength" or "yield stress" refers to the stress maxima in the stress-strain curve experienced by the polymer during tensile deformation just after the linear elastic region, polymers deformed beyond the yield stress usually show permanent deformation. Beyond the "tensile yield stress" point in the stress-strain profile of the polymer, the stress experienced by the polymer during stretching may remain less than that of the yield stress. Thus, "tensile strength" that is defined at the stress experienced by polymer at fracture or failure point can be lower than the yield strength. In some polymers, the tensile stress experienced at failure is significantly higher than that of the yield stress. In such cases, the stress-strain curve shows a rise (sometimes steep rise) in stress with increase in strain due to enhanced molecular orientation along the direction of deformation. Such a phenomenon of increase in the stress at large strain values (as the polymer molecules orient) is known as "strain hardening".

For some of the exemplary yield stress values provided above, the tensile strength (i.e., the tensile stress experienced at failure, i.e., "tensile failure strength" or "ultimate tensile strength") of the polymer blend will be higher according to the known difference in how yield stress and tensile failure strength are defined. The polymer blend material should possess a tensile failure strength of at least or above 10 MPa. In different embodiments, the polymer blend material may exhibit a tensile failure strength of at least or above, for example, 10 MPa, 12 MPa, 15 MPa, 20 MPa, 25 MPa, 30 MPa, 35 MPa, 40 MPa, 45 MPa, or 50 MPa, or a tensile failure strength within a range bounded by any two of the foregoing exemplar) values. In some embodiments, the polymer composition does not show strain hardening; it fails at a stress below the yield stress while stretching. Any of the above tensile yield strengths can be exhibited while at an elongation or strain of at least or above 0.1%, 0.2%, 0.5%, 1, 10%, 20%, or 50%. The strain corresponding to the yield stress is called "yield strain". In other embodiments, the polymer blend material does not show a prominent yield stress.

The polymer blend material preferably possesses an ultimate elongation (i.e., elongation at break) of at least or above the yield strain. In some embodiments, the polymer blend material preferably possesses an ultimate elongation of at least or above 20%. In different embodiments, the polymer blend material may exhibit an ultimate elongation of at least or above 20%, 50%, 100%, 110%, 120%, 150%, 180%, 200%, 250%, 300%, 350%, 400%, 450%, or 500%, or an ultimate elongation within a range bounded by any two of the foregoing exemplary values. In some embodiments, the polymer blend material possesses any of the above preferable elongation characteristics along with any of the preferable yield stress or tensile strength characteristics, also provided above.

In some embodiments, the polymer blend material exhibits a tensile stress or tensile failure strength of at least or above 5 MPa or 10 MPa at 1% elongation. In other embodiments, the polymer blend material exhibits a tensile stress or tensile failure strength of at least or above 5 MPa or 10 MPa at 10% elongation. In some embodiments, the tensile stress at 10% elongation is at least or above 10 MPa. In specific embodiments, the tensile stress at 50% elongation is at least or above 5 MPa, 10 MPa, 15 MPa, 20 MPa, 30 MPa, 40 MPa, or 50 MPa. In some embodiments, the tensile stress at 100% elongation is at least or above 5 MPa, 10 MPa, 15 MPa, 20 MPa, 30 MPa, or 50 MPa. A conventional cross-linked (also known as vulcanized) NBR matrix containing 50 parts per hundred resin lignin may exhibit a tensile strength of only 1.5 MPa, a tensile stress at 100% elongation of 1.3 MPa, and 250% ultimate elongation, and likely no yield stress (Setua D K, et al., POLYMER COMPOSITES, Vol. 21, No. 6, 988-995, 2000). Compared to these results, compositions of the present disclosure show dramatically improved mechanical properties.

In particular embodiments, the polymer blend material possesses a yield stress or tensile failure strength of at least or above 10 MPa, 15 MPa, 20 MPa, 25 MPa, 30 MPa, 40 MPa, or 50 MPa along with an ultimate elongation of at least or above 20%, 30%, 40%, 50%, 100%, 150%, 180%, 200%, 250%, or 300%. Moreover, in some embodiments, the polymer blend material exhibits strain hardening during mechanical deformation, such as during stretching beyond yield strain to ultimate failure.

In another aspect, the present disclosure is directed to methods for producing the polymer blend material described above. In the method, at least (or only) the components (i), (ii), and (iii) are mixed and homogeneously blended to form the polymer blend material. Any of the relative amounts by weight of components (i), (ii), and (iii), as described above, can be used in the process to result in a polymer blend containing the same relative amounts of components. Any one of the components can be included in liquid form (if applicable), in solution form, or in particulate or granular form. In the case of particles, the particles may be, independently, nanoparticles (e.g., at least 1, 2, 5, or 10 nm, and up to 20, 50, 100, 200, or 500 nm), microparticles (e.g., at least 1, 2, 5, or 10 μm, and up to 20, 50, 100, 200, or 500 μm), or macroparticles (e.g., above 500 μm, or at least or up to 1, 2, 5, 25, 50, 100, 500, or 1000 mm). Typically, if any polymeric component is provided in particle or granular form, the particles are melted or softened by appropriate heating to permit homogeneous blending and uniform dispersion of the components. The components can be homogeneously blended by any of the methodologies known in the art for achieving homogeneous blends of solid, semi-solid, gel, paste, or liquid mixtures. Some examples of applicable blending processes include simple or high-speed mixing, compounding, extrusion, or ball mixing, all of which are well-known in the art. In some embodiments, the NBR polymer is in solid bale form, which can be cut into useable chunks using standard bale cutting tools. Chunks of different sizes can be mixed or blended with other component(s) in an internal mixer (such as Banbury mixer). In other embodiments, the NBR polymer is in latex form and is mixed or blended with component(s) in a ball mill. In other embodiments, the NBR polymer is in sheet form and the components are mixed in a two-roll mill.

By being "homogeneously blended" is meant that, in the macroscale (e.g., 1 millimeter or above), no discernible regions of at least components (i), (ii), and (iii) exist. If an additional modifying agent, as discussed above, is included, all or a portion of the modifying agent may or may not remain in the solid (unmelted) phase, e.g., either in elemental state (e.g., carbon particles) or in crystalline lamella phase (e.g., polyethylene oxide). In other words, the homogeneous blend may possess a modified or compatibilized phase structure (not necessarily a single phase structure, but often with retained but shifted $T_g$ associated with individual phases) for at least components (i) and (ii). The modified-phase structure generally indicates near homogeneous integration at microscale or near the molecular level without losing each component's identity. In the case of an additional non-homogeneous component, the instantly described polymer blend including components (i), (ii), and (iii) can be viewed as a "homogeneous matrix" in which the additional non-homogeneous component is incorporated. Preferably, all of the components retain their identity and components are well dispersed at the nanometer scale.

In some embodiments, the mixture being blended further includes a crosslinking (or curing) agent, which may be a radical or physical crosslinking agent. A particular example of a physical crosslinking or curing agent is sulfur. The radical crosslinking agent is any substance that produces radicals to effect crosslinking of component (i) and/or (ii) either during the blending process and/or subsequently during a conditioning process, activation process, curing process, and/or shape-forming process. The radical crosslinking agent may decompose under thermal or radiative exposure to form reactive radicals. The radical crosslinking agent may be, for example, any of the radical polymerization initiators known in the art. In particular embodiments, the radical crosslinking agent is an organic peroxide compound. Some examples of organic peroxide compounds include dicumyl peroxide (DCP), t-butyl peroxide, benzoyl peroxide, methyl ethyl ketone peroxide, and acetone peroxide. The radical crosslinking agent may alternatively be an inorganic peroxide compound, such as a peroxydisulfate salt. The radical crosslinking agent may or may not also be selected from non-peroxide radical-producing compounds, such as azo compounds (e.g., AIBN or ABCN), or a halogen (e.g., Br, or $I_2$). In some embodiments, radical crosslinking may be achieved by physical means, such as by exposure of the material to electron beam (e.g., Stelescu et al., *The Scientific World. Journal,* 684047, 2014) or ultraviolet (UV) radiation (e.g., Naskar et al., *Carbon,* 43(5) 1065-1072, 2005) that generates free radicals for crosslinking of the components. Hydrocarbon polymers generate free radicals by exposure to electron beam radiation. In some embodiments, to facilitate UV crosslinking, the polymer blend may be further modified with acrylates and/or conjugated ketones (benzophenone derivatives) additives that generate free radicals when exposed to UV radiation. In other embodiments, any one or more specific types or general class of crosslinking or curing agents are excluded from the preparation process.

The process for preparing the polymer blend material can employ any of the weight percentages (i.e., wt. %) of components provided in the above earlier description of the polymer blend material. Moreover, during the process (i.e., during blending), certain ranges in processing temperature (i.e., during blending), shear rate, and processing time (i.e., duration of blending at a particular temperature) have been found to be particularly advantageous in producing a polymer blend material having particularly desirable physical characteristics. With respect to processing temperature, the blending process is preferably conducted at a temperature of at least or above 120° C. and up to or less than 220° C., which may be a temperature of about, for example, 120° C., 130° C., 140° C., 150° C., 160° C., 170° C., 180° C., 190° C., 200° C., 210° C., or 220° C., or a temperature within a range bounded by any two of the foregoing values (e.g., 120-220° C., 130-210° C., 140-200° C., 150-200° C., 150-190° C., or 150-180° C.). With respect to the shear rate (which is related to the mixing speed in rpm), the blending process is preferably conducted at a shear rate of at least or above 10 $s^{-1}$ and up to or less than 1000 $s^{-1}$, which may be a shear rate of about, for example, 10, 20, 30, 40, 50, 100, 150, 200, 250, 300, 350, 400, 500, 600, 700, 800, 900, or 1000 $s^{-1}$, or a shear rate within a range bounded by any two of the foregoing values. The mixing rate (in rpm) corresponding to the foregoing shear rate range is approximately 1-150 revolutions of the blades per minute. With respect to processing time, the blending process preferably employs a processing time (time during blending at a particular temperature and shear rate) of at least or above 5 minutes and up to or less than 120 minutes, which may be a processing time of about, for example, 5, 10, 20, 30, 40, 50, 60, 70, 80, 90, 100, 110, or 120 minutes, or a time within a range bounded by any two of the foregoing values.

The polymer blend material is typically subjected to a shape-forming process to produce a desired shape of the polymer blend. The shape-forming process can include, for example, extrusion molding (e.g., pour, injection, or compression molding), melt pressing, or stamping, all of which are well known in the art. In other embodiments, the polymer blend material is used in a printing process to form a shape containing the polymer blend material, wherein the printing process can be, for example, a rapid prototyping (RP) process known in the art, such as a fused deposition modeling (FDM) or fused filament fabrication (FFF) process known in the art, which may also be collectively considered as 3D printing processes. In some embodiments, the compression molded blends are further annealed or cured at a temperature below its molding temperature for it to form equilibrium morphology. The temperature can be between $T_g$ of the lignin and the molding temperature. In some blends, the annealing temperature is between 70-150° C. A convection oven can be used for annealing of initially molded blends. During annealing, the blend components undergo both stress relaxation and a crosslinking reaction.

In still other aspects, the invention is directed to an article containing the polymer blend described above. The article is typically one in which some degree of toughness is desired along with high mechanical strength. The blend may or may not be further reinforced with, for example, continuous carbon, ceramic, or metallic fibers to produce composite parts. The article may be used as or included in any useful component, such as a structural support, the interior or exterior of an automobile, furniture, a tool or utensil, or a high strength sheet or plate. In some embodiments, the polymer blend may be produced and applied as a coating or film, such as a protective film. The polymer blend may be rendered as a coating or film by, for example, melting the blend or dissolving the components of the blend in a suitable solvent, followed by application of the liquid onto a suitable substrate and then solvent removal.

Examples have been set forth below for the purpose of illustration and to describe certain specific embodiments of the invention. However, the scope of this invention is not to be in any way limited by the examples set forth herein.

Example 1

Effect of Zinc Ions on Lignin-NBR Polymer Blends

Zinc cations ($Zn^{+2}$) can link nitrile groups of NBR with aliphatic and phenolic hydroxy groups and ether linkages of lignin, thereby aiding interfacial crosslinking between NBR and lignin and tailoring ABL morphology and performance. Without being bound by theory, it is herein hypothesized that such favorable electrostatic interactions promote a reduction in the size of lignin domains in the NBR matrix, which leads to an increase in the interfacial area between lignin and NBR phases. FIG. 1A is a drawing schematic depicting structural changes occurring in a NBR-lignin (ABL) polymer blend composition caused by compounding with $ZnCl_2$. The image on the right shows that zinc cations ($Zn^{+2}$) can link nitrile groups of NBR with anions from phenolic hydroxyl groups of lignin to aid interfacial crosslinking between NBR and lignin.

Figure 1B:
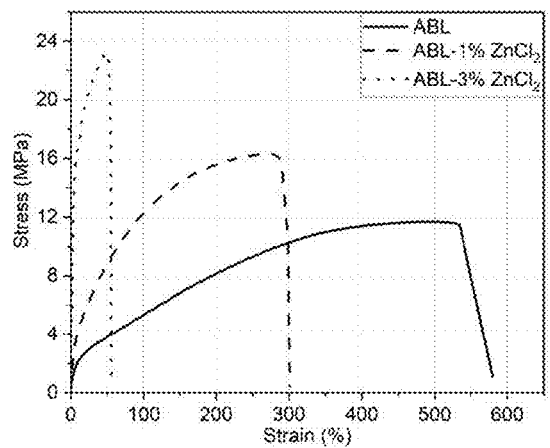
FIG. 1B shows representative stress-strain curves for ABL, ABL with 1 wt. % $ZnCl_2$, and ABL with 3 wt. % $ZnCl_2$ melt mixed at 160° C.
Figure 1C:
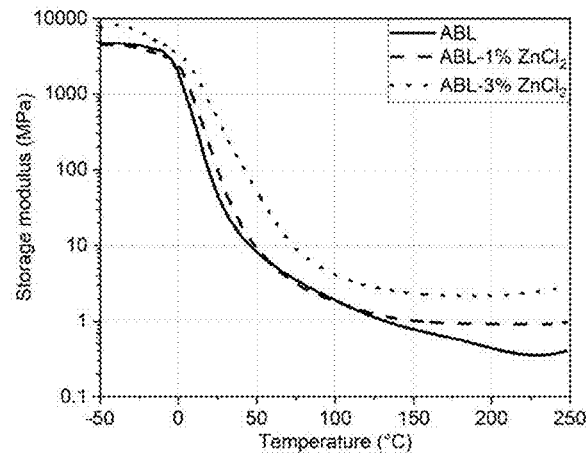
FIG. 1C shows the corresponding temperature-dependent dynamic mechanical storage modulus for ABL, ABL with 1 wt. % $ZnCl_2$, and ABL with 3 wt. % $ZnCl_2$.
Figure 1D:
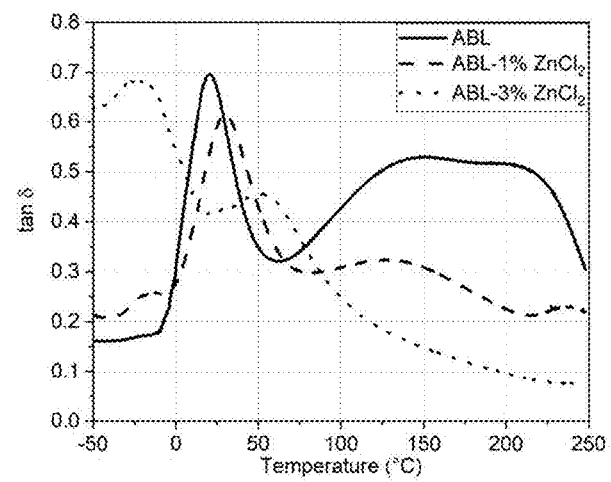
FIG. 1D shows corresponding loss tangent (tan δ) spectra at 160° C. for ABL. ABL with 1 wt. % $ZnCl_2$, and ABL with 3 wt. % $ZnCl_2$.

Combining solvent fractionated, melt-stable sinapyl alcohol-rich (SA-rich) lignin with a commodity NBR having 41 mol % acrylonitrile (AN) content in a melt-mixer at 160° C. resulted in a low-crosslinked ABL rubber. Incorporating a small amount of $ZnCl_2$ (1-3 wt. %) during the melt-mixing followed by a molding process delivered rigid specimens. Stress-strain curves at ambient temperature and dynamic mechanical data over a range of temperatures are shown in FIGS. 1B-1D. Specifically, FIG. 1B shows representative stress-strain curves for ABL, ABL with 1 wt. % $ZnCl_2$, and ABL with 3 wt. % $ZnCl_2$; FIG. 1C shows the corresponding temperature-dependent dynamic mechanical storage modulus for ABL, ABL with 1 wt. % $ZnCl_2$, and ABL with 3 wt. % $ZnCl_2$; and FIG. 1D shows corresponding loss tangent spectra at 160° C. for ABL, ABL with 1 wt. % $ZnCl_2$, and ABL with 3 wt. % $ZnCl_2$. The data show that the ionic modification substantially affected the mechanical properties. The native rubbery material was transformed into a toughened plastic-like product with high strength and modulus with ~50% strain to failure.

The transition from a rubbery matrix to a plastic-like material was confirmed by differential scanning calorimetry (DSC), with data shown below in Table 1. The data in Table 1 shows an increasing glass transition temperature, $T_g$, with increasing $ZnCl_2$ content. The ABL had a $T_g$ of ca. 4° C., which increased to ca. 9° C. and 14° C. with the addition of only 1 and 3 wt. % $ZnCl_2$, respectively. By contrast, the neat NBR exhibited a $T_g$ of ca. -17° C. Increased $T_g$ in the ion-modified material causes increased rigidity of the matrix. Neat NBR can thermally crosslink during the melt-mixing step and shows increased crosslinking with the addition of $ZnCl_2$ (F. Shen et al., *J. Polym. Sci. B.* 2007, 45(1), 41-51). However, such crosslinking does not significantly increase the $T_g$ of the NBR matrix. Incorporation of lignin only in NBR increases the $T_g$ and broadens the transition temperature range, improving the material's processability. Incorporating $ZnCl_2$ further broadens the transition and shift to higher temperatures.

TABLE 1

Presence of $ZnCl_2$ results in increase of glass transition temperature ($T_g$).

| Formulation, 160° C. blends | $T_g$ (° C.) | Formulation, 185° C. blends | $T_g$ (° C.) |
| --- | --- | --- | --- |
| Neat NBR | -17 | — | — |
| Neat lignin/NBR blend | 4 | Neal lignin/NBR blend | 3 |
| $ZnCl_2$, 1 wt % | 9 | $ZnCl_2$, 1 wt % | 15 |
| $ZnCl_2$, 3 wt % | 14 | $ZaCl_2$, 3 wt % | 26 |

The dynamic storage modulus, E', (FIG. 1C) exhibits a small drop at about -20° C. in the $ZnCl_2$ blends, which indicates minor relaxation of rubbery segments. This relaxation gets more pronounced with increased $ZnCl_2$ loading and is barely noticeable in the blends without $ZnCl_2$. At 0° C., a sharp drop begins to appear, which indicates the $T_g$ onset of the blend, which increases with additional $ZnCl_2$ loading. These observations show not only that the $T_g$ shifts toward a higher temperature with increasing additive loading but also that E' increases (FIG. 1C). A plateau modulus regime (150-250° C.) appears in the samples containing $ZnCl_2$, which indicates the presence of a crosslinked structure. In contrast, the neat blend exhibits a distinguishable decrease in E' across the investigated temperature range. Additionally, the modulus of the 1 wt. % $ZnCl_2$ blend is higher than the ABL at temperatures above ~125° C.; the 3 wt. % $ZnCl_2$ blend exhibits a substantially higher modulus across the entire plateau regime. These characteristics indicate that $ZnCl_2$ is primarily responsible for the increased crosslinks in the ion-modified ABLs.

In the dynamic mechanical thermal transitions (FIG. 1D), a substantial decrease in the loss tangent (tan-δ) values is observed at the rubbery plateau region with increased $ZnCl_2$ loading. The higher tan-δ value of the ABL within the temperature window of 80-230° C. is due to the relaxation of rubber-bound lignin phases. This response begins disappearing with the addition of 1 wt. % $ZnCl_2$ and completely disappears with 3 wt. % $ZnCl_2$. However, the corresponding tan-δ peak for the phase relaxation shows decreased peak height, and peak position shifts to higher temperatures with $ZnCl_2$ inclusion. The incorporation of $Zn^{+2}$ ions in the ABL matrix causes the loss tangent peak of the original ABL to split into two peaks—a higher temperature peak due to the "ionomeric" reinforced phase and a lower temperature peak likely due to the relaxation associated with the less constrained native NBR phase. The evidence indicates that a higher degree of interfacial crosslinks between NBR and lignin not only enhances rigidity of the rubbery matrix but also leaves some NBR segments less coerced, resulting in reduced $T_g$.

FIGS. 2A-2C are transmission electron microscopy (TEM) images showing different lignin-aggregated domains. FIG. 2A shows a TEM image for ABL without $ZnCl_2$ (with lignin appearing as large and darker grey domains interspersed within the NBR matrix, appearing as white); FIG. 2B shows a TEM image for ABL with 1 wt. % $ZnCl_2$ included; and FIG. 2C shows a TEM image for ABL with 3 wt. % $ZnCl_2$ included. The TEM images show the presence of lignin domains (darker gray) as hard segments interspersed in the polymer matrix. For ABL without $ZnCl_2$, as show in FIG. 2A, lignin is observed as large domains (~1 m) in the ABL. Significantly, as shown in FIGS. 2B and 2C, increasing the $ZnCl_2$ loading from 1 wt. % to 3 wt. % breaks down the lignin domains into well-dispersed nanometer-scale domains. These domains are also visible by scanning electron microscopy.

The effect of ion concentration on the lignin dispersion using small-angle x-ray scattering (SAXS) was also studied. FIG. 2D shows the corresponding small angle x-ray scattering (SAXS) data for lignin, NBR, ABL, ABL with 1 wt. % $ZnCl_2$, and ABL with 3 wt. % $ZnCl_2$. FIG. 2D shows a low-Q upturn of intensity in the pristine lignin and NBR samples. The ABL sample shows a broad shoulder combined with the low-Q upturn. A more distinguishable shoulder, between 0.02-0.06 $Å^{-1}$, was determined in the samples containing 1 and 3 wt. % $ZnCl_2$. These ion-modified ABLs exhibit a slight shift of the shoulder peak to a higher-Q regime (FIG. 2D).

The measured SAXS data were fitted with a correlation length model, as presented in Table 2 below. The inter-aggregate distance derived from the position of the shoulder can be obtained using $d=2\pi/Q_o$, where $Q_o$ is the peak position of the shoulder. This peak corresponds to the inter-aggregate distance between the lignin clusters in $Zn^{2+}$-modified ABL, and is ~30 to 40 nm, which is smaller than the correlation distance between lignin domains in ABL (~60 nm) (Table 2). Thus, the SAXS data suggest improved packing of the reinforcing lignin domains in the ion-modified ABL.

TABLE 2

Fitting results of the SAXS data using the correlation length model.

|  | ABL | ABL, 1 wt % $ZnCl_2$ | ABL, 3 wt % $ZnCl_2$ |
| --- | --- | --- | --- |
| Porod exponent*, n | 3.48 | 3.45 | 3.85 |
| Peak Position, $Q_0$ ($Å^{-1}$) | 0.0104 | 0.0412 | 0.0201 |
| Peak half width at half maximum, ($Å^{-1}$) | 0.0210 | 0.0297 | 0.0414 |
| Correlation distance, d ($2\pi/Q_0$), Å | 604 | 442 | 312 |

*Porod exponent (n) is obtained by fitting the SAXS pattern using the following equation:

$$I(Q) = \frac{A}{Q^n} + \frac{C}{1+\left(\frac{Q-Q_0}{B}\right)^2}.$$

where A = Porod scale, n = Porod exponent, C = Lorentz scale, $Q_0$ = peak position, and B = peak half width at half maximum The presence of a shoulder on the upturn at low-Q between 0.01-0.10 $Å^{-1}$ was observed earlier in various ionomers and was interpreted to be the classical "ionomer peak" arising from the ionic inter-aggregate interference (A. Batra et al., *Macromolecules* 2006, 39, 1630). Ionic clusters of components with typical ~20 nm sizes are known to exhibit two relaxation transitions in loss tangent profiles (E. B. Trigg et al., *Nature Materials*. 2018, 17, 725). As hypothesized, $ZnCl_2$ can react with lignin phenolic hydroxyl groups and form ionic zinc salt of phenols. Therefore, the lignin-NBR blends modified with $ZnCl_2$ can be considered to be materials composed of ionomers. The formation of ionic multiplets between divalent $Zn^{+2}$ ions and anions was observed earlier (R. B. Moore et al., *Macromolecules*, 1991, 24(6), 1376-1382).

Melt-phase synthesis at higher temperatures is believed to further enhance interactions between the components and raise the $T_g$ of ABL. The $T_g$ (by DSC) of ion-modified ABL processed at 185° C. is 26° C., which is 12° C. higher than the composition processed at 160° C. However, prolonged (~1 hour) thermal mixing at this temperature simultaneously causes thermal degradation and crosslinking of lignin (X. Wang et al., *Soft Matter*, 2012, 8(11), 3036-3052). Additionally, the hydrochloric acid released from the reaction of lignin with $ZnCl_2$ causes acid-catalyzed crosslinking in lignin (N. A. Nguyen et al., *Polymer*, 2019, 160, 210-222).

Figure 3A:
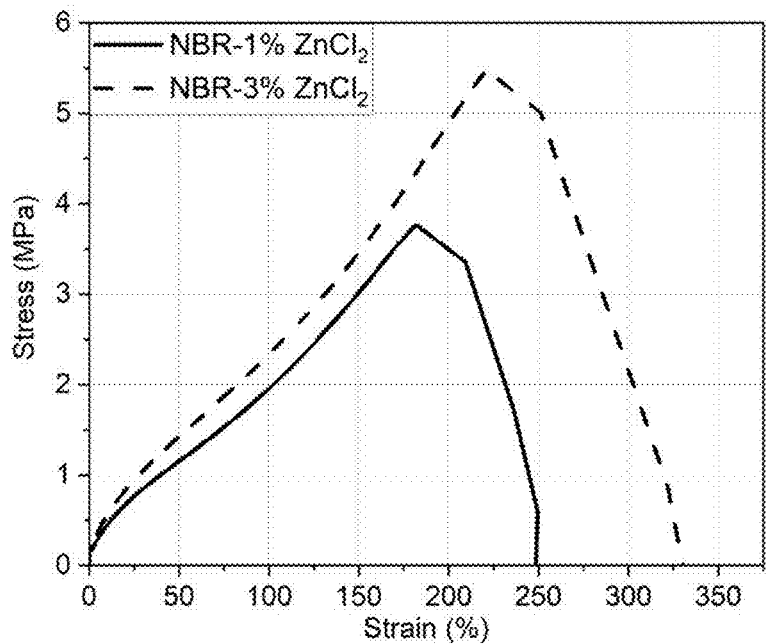
FIG. 3A shows tensile stress-strain curves for NBR containing 1 wt. % and 3 wt. % $ZnCl_2$ processed at 185° C.
Figure 3B:
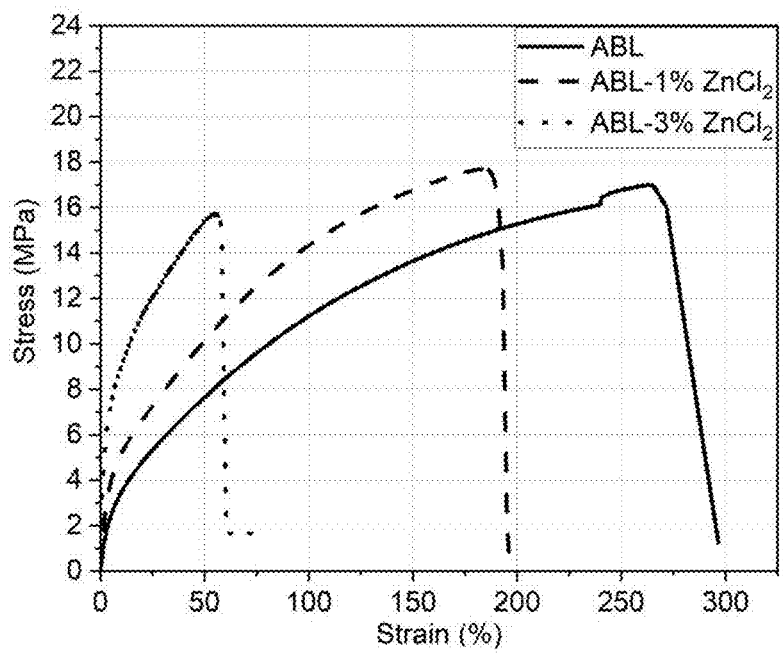
FIG. 3B shows tensile stress-strain curves for ABL compositions with and without $ZnCl_2$ (1 wt. % and 3 wt. % $ZnCl_2$) and without $ZnCl_2$ processed at 185° C.

FIG. 3A shows tensile stress-strain curves for NBR containing 1 wt. % and 3 wt. % $ZnCl_2$ processed at 185° C. FIG. 3B shows tensile stress-strain curves for ABL compositions with and without $ZnCl_2$ (1 wt. %6 and 3 wt. % $ZnCl_2$) processed at 185° C. As shown in FIGS. 3A and 3B and the data in Table 3 below, the tensile strength enhancement of the materials by ionic modification appears insignificant when processed at higher temperature (185° C.), although enhancement of Young's modulus remains prominent. From these results, it appears beneficial to manufacture the ion-modified ABLs at temperatures less than the onset temperature of lignin's degradation on-set temperature.

TABLE 3

The differences in Young's modulus, tensile strength, and elongation at break of the neat ABL blend and $ZnCl_2$-modified ABL samples at (a) 160° C. and (b) 185° C. The data are reported as an average of four test specimens.

| Formulation | Young's modulus, MPa | Break strain, % | Peak stress, MPa |
| --- | --- | --- | --- |
| (a) Processing T = 160° C. | | | |
| Neat blend | 12.990 (5.360) | 450.986 (107.365) | 10.50 (3.37) |
| $ZnCl_2$, 1 wt % | 68.541 (11.022) | 258.728 (35.531) | 16.17 (0.57) |
| $ZnCl_2$, 3 wt % | 628.20 (455.35) | 57.34 (9.40) | 23.22 (1.45) |

TABLE 3-continued

The differences in Young's modulus, tensile strength, and elongation at break of the neat ABL blend and ZnCl$_2$-modified ABL samples at (a) 160° C. and (b) 185° C. The data are reported as an average of four test specimens.

| Formulation | Young's modulus, MPa | Break strain, % | Peak stress, MPa |
|---|---|---|---|
| (b) Processing T = 185° C. | | | |
| Neat blend | 30.43 (15.93) | 284.03 (60.54) | 17.68 (3.11) |
| ZnCl$_2$, 1 wt % | 86.52 (32.45) | 177.95 (20.33) | 17.84 (1.33) |
| ZnCl$_2$, 3 wt % | 476.27 (173.29) | 45.47 (17.86) | 16.26 (2.54) |

Figure 4A:
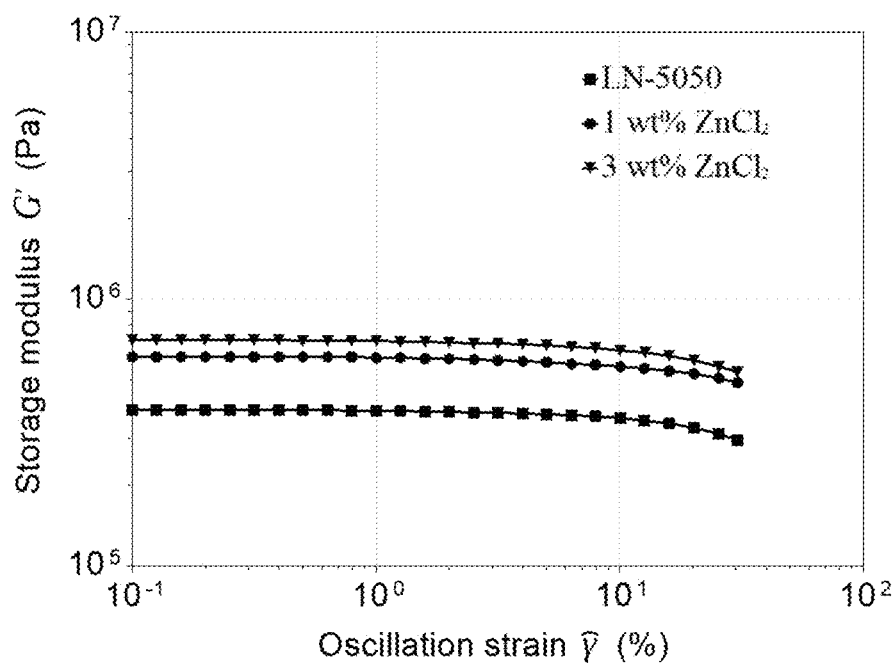
FIGS. 4A-4D show melt rheological data of the lignin-NBR blends, both the neat ABL (LN-5050) samples and the ABL samples containing 1 wt. % and 3 wt. % $ZnCl_2$, processed at 160° C. The plots depict storage modulus (FIG. 4A), oscillation stress as a function of oscillation strain (FIG. 4B), storage modulus (FIG. 4C), and complex viscosity as a function of angular frequency (FIG. 4D). All measurements were performed at a reference temperature of 170° C.
Figure 4B:
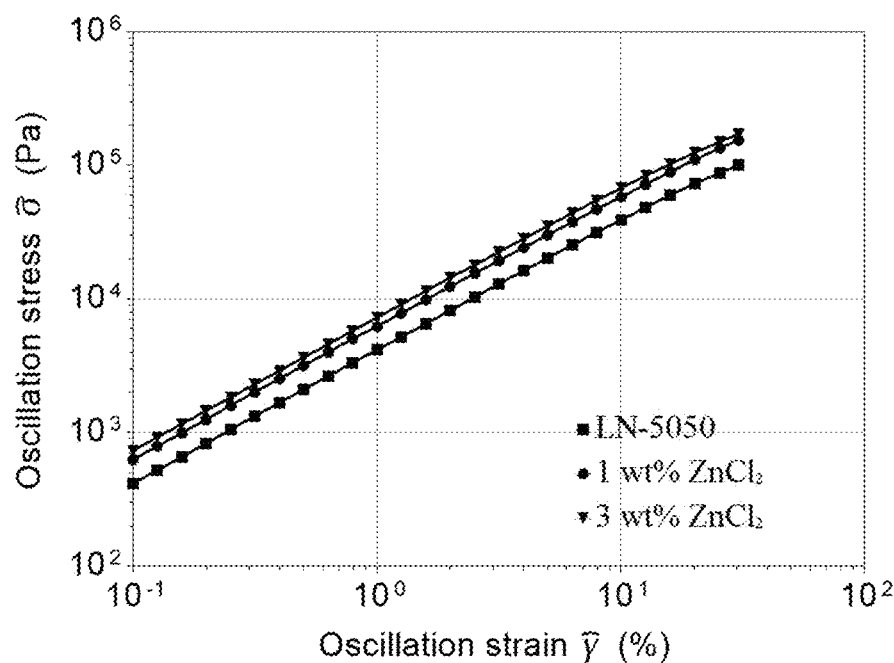
Figure 4C:
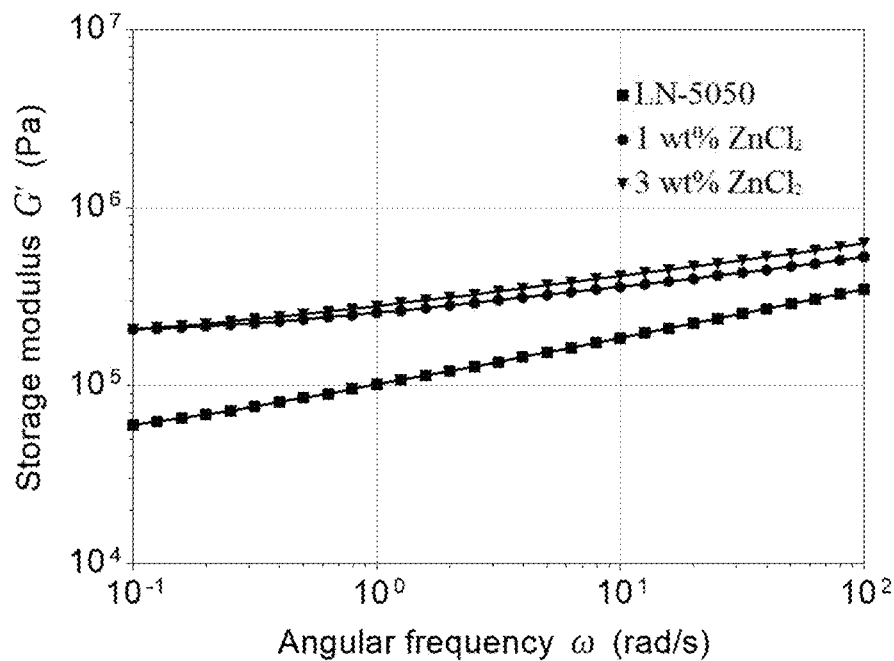
Figure 4D:
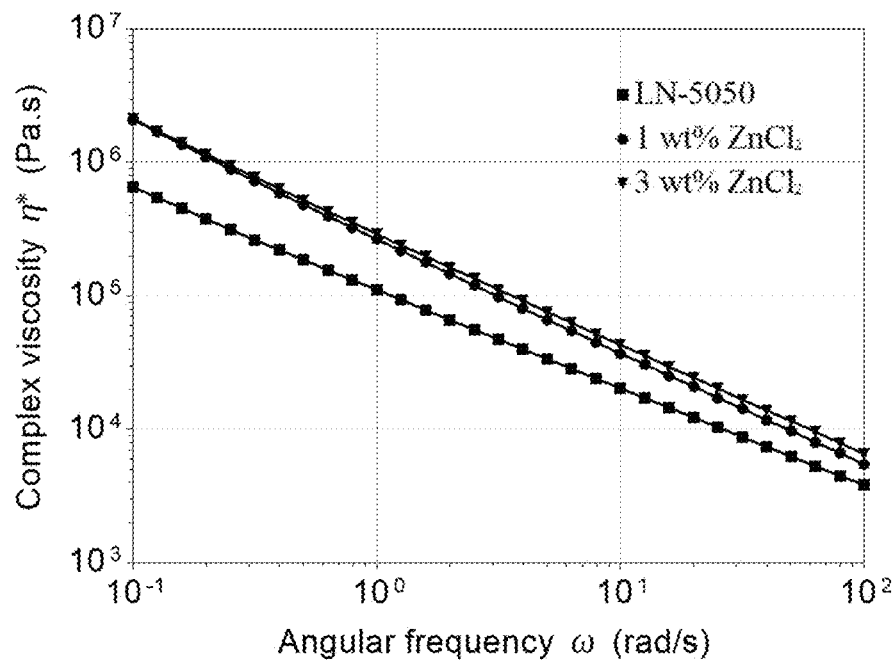

Melt rheology was used to examine the dynamics of the studied samples, with the results shown in FIGS. 4A-4D. FIGS. 4A-4D show melt rheological data of the lignin-NBR blends, both the neat ABL (LN-5050) samples and the ABL samples containing 1 wt. % and 3 wt. % ZnCl$_2$, processed at 160° C. The plots depict storage modulus (FIG. 4A), oscillation stress as a function of oscillation strain (FIG. 4B), storage modulus (FIG. 4C), and complex viscosity as a function of angular frequency (FIG. 4D). All measurements were performed at a reference temperature of 170° C. The ionomeric ABLs exhibit higher storage shear modulus (G') (FIG. 4A), oscillation stress (FIG. 4B), and complex viscosity (FIG. 4C) commensurate with the mechanical properties. Formation of ionic networks is responsible for increased viscosity and modulus. However, these networks do not impose severe processability issues as these are thermolabile networks and their influence is greatly diminished at high shear rate regimes.

Figure 5A:
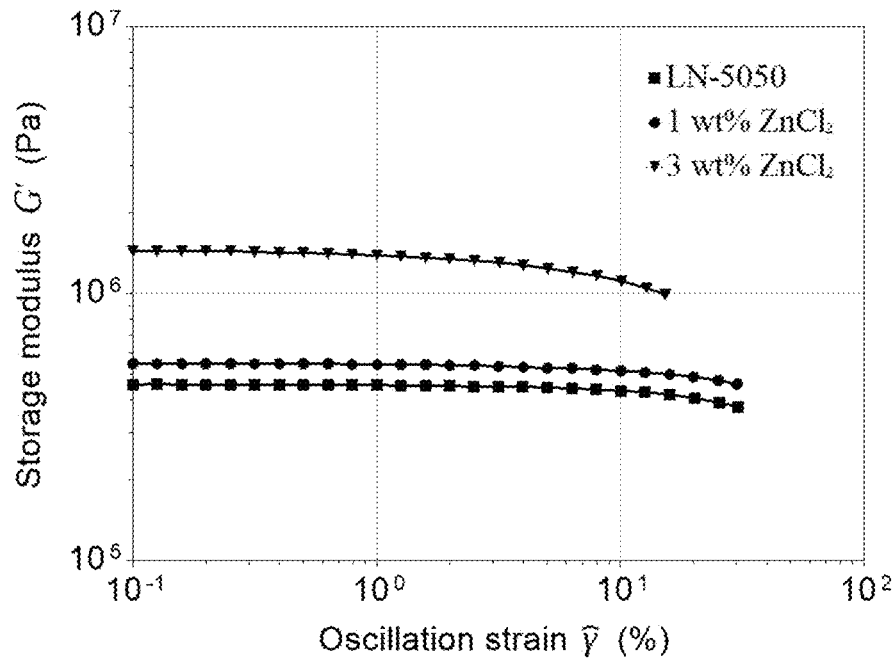
FIGS. 5A-5D show rheological data for different lignin-NBR blends, both the neat ABL (LN-5050) samples and the ABL samples containing 1 wt. % and 3 wt. % $ZnCl_2$, processed at 185° C. The plots depict storage modulus (FIG. 5A), oscillation stress as a function of oscillation strain (FIG. 5B), storage modulus (FIG. 5C), and complex viscosity as a function of angular frequency (FIG. 5D). All measurements were performed at a reference temperature of 170° C.
Figure 5B:
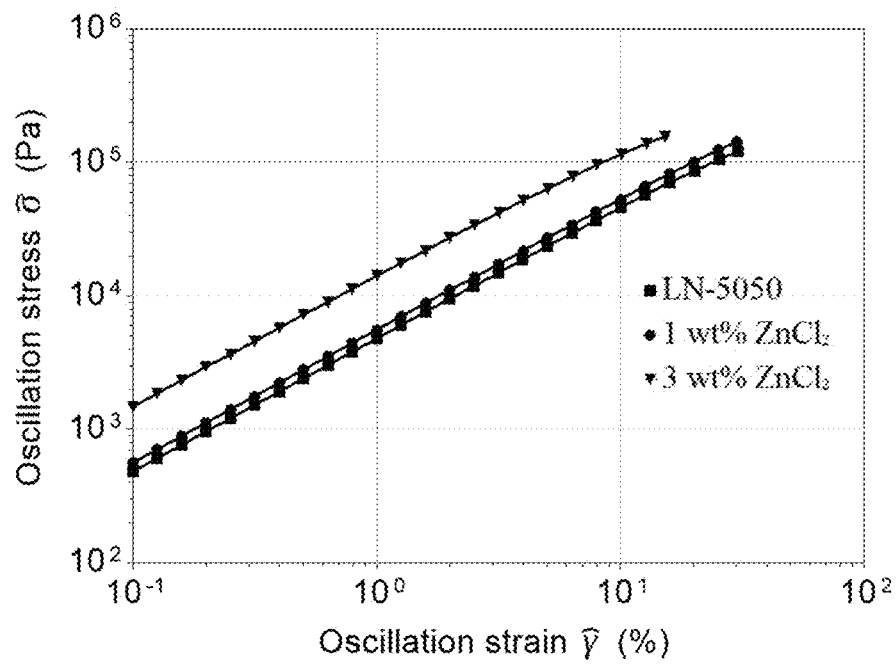
Figure 5C:
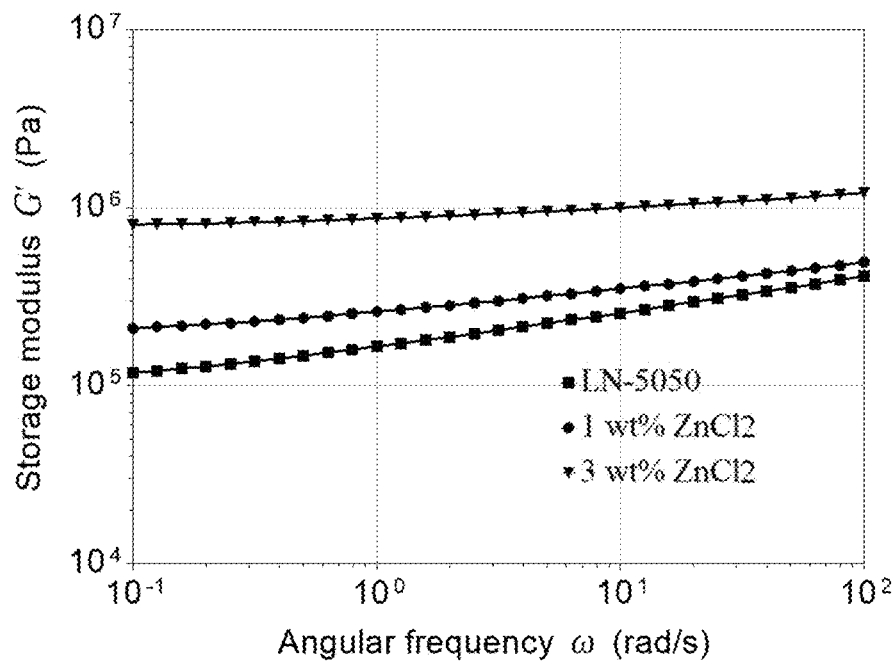
Figure 5D:
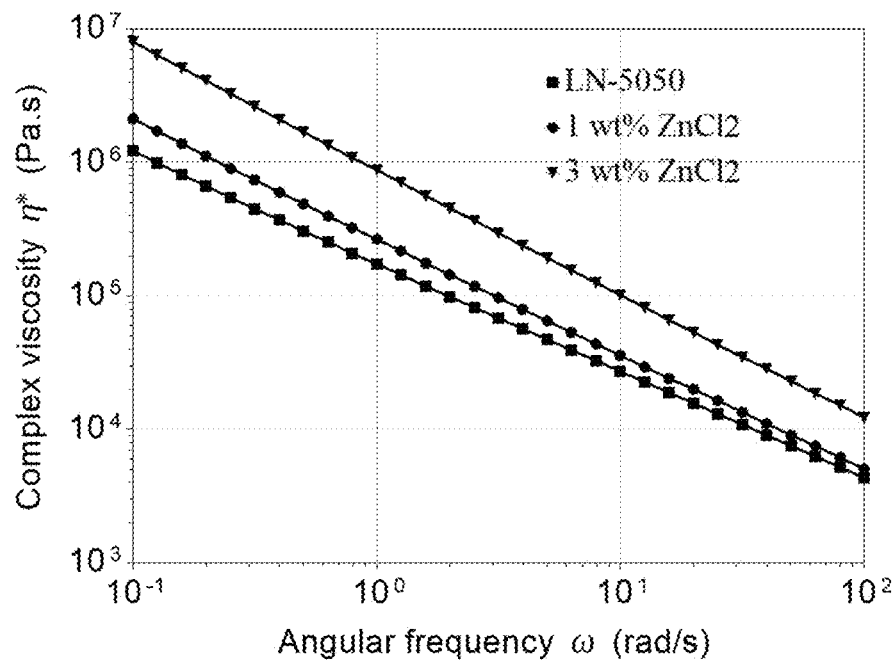

FIGS. 5A-5D show rheological data of different lignin-NBR blends, both the neat ABL (LN-5050) samples and the ABL samples containing 1 and 3 wt. % ZnCl$_2$, processed at 185° C. The plots depict storage modulus (FIG. 5A), oscillation stress as a function of oscillation strain (FIG. 5B), storage modulus (FIG. 5C), and complex viscosity as a function of angular frequency (FIG. 5D). All measurements were performed at a reference temperature of 170° C. The results show that higher temperature processing of the ion-modified ABLs resulted in a more networked structure and higher material stiffness.

The above results demonstrate that a melt-processible blend of nitrile rubber with a sinapyl alcohol-rich lignin modified with ZnCl$_2$ resulted in a stiff, strong plastic. The ionic modification disintegrates the large lignin domains and creates nano-lignin clusters that act as rigid thermoplastic blocks in the soft rubber matrix. By harnessing the ionomeric properties of lignin, it has herein been demonstrated that a rubbery matrix can be transformed to a rigid toughened thermoplastic with the addition of a small number of cations. The disappearance of the lignin phase relaxation and the enhanced rubbery plateau moduli in ionically crosslinked systems suggest improved adhesion between the lignin clusters and the rubber at their interfaces. Because of this increased ionic crosslinking, the shear-thinning thermoplastic ionomers show superior melt-elasticity. These materials may be used in structural components, such as building siding, automotive oil-resistant thermoplastic rubbers, and outdoor products with improved ultraviolet and oxidation resistance.

The above results further demonstrate that anionic lignin, formed during alkaline deconstruction of biomass for the separation of lignin and cellulose, can be used to make high-value renewable thermoplastics. In contrast to studies that produced ionomeric elastomers, the present disclosure demonstrates transformation of a rubber to a glassy plastic material by ionomeric lignin. This present disclosure also provides a path to address the heterogeneity obstacles in using widely available lignin feedstocks. The ionomeric composition containing 50 wt. % lignin not only exhibits excellent mechanical properties and processability but also provides a positive environmental impact since the ionomeric composition can be used as a renewable replacement of conventional building blocks, such as styrene.

While there have been shown and described what are at present considered the preferred embodiments of the invention, those skilled in the art may make various changes and modifications which remain within the scope of the invention defined by the appended claims.

What is claimed is:

1. A polymer blend material comprising:
   (i) a melt-stable sinapyl alcohol-rich hardwood lignin component containing at least 50 wt % of syringyl (S) component relative to total lignin components;
   (ii) a nitrile butadiene rubber component having an acrylonitrile content of 40-55 mol %; and
   (iii) zinc chloride;
   wherein components (i), (ii), and (iii) are blended at a temperature of 150-190° C. to produce the polymer blend material;
   wherein:
   component (i) is present in an amount of about 50 wt % by weight of components (i) and (ii);
   component (i) is dispersed in component (ii) in the form of domains, wherein at least 80% of the domains have a size of up to 200 nm;
   component (iii) is present in an amount of 0.5-4 wt. % by weight of components (i) and (ii); and
   the polymer blend material has a tensile failure strength of at least 10 MPa, and an elongation at break of at least 20%.

2. The polymer blend material of claim 1, wherein said nitrile butadiene rubber component has an acrylonitrile content of 50-55 mol %.

3. The polymer blend material of claim 1, wherein component (i) is dispersed in component (ii) in the form of domains having a size of up to 100 nm.

4. The polymer blend material of claim 1, wherein component (i) is dispersed in component (ii) in the form of domains having a size of up to 50 nm.

5. The polymer blend material of claim 1, wherein component (i) is dispersed in component (ii) in the form of domains having a size of up to 20 nm.

6. The polymer blend material of claim 1, wherein component (i) is dispersed in component (ii) in the form of domains having a size of up to 10 nm.

7. The polymer blend material of claim 1, wherein component (i) is dispersed in component (ii) in the form of domains having a size of up to 500 nm.

8. The polymer blend material of claim 1, wherein component (iii) is present in an amount of 0.5-3 wt. % by weight of components (i) and (ii).

9. The polymer blend material of claim 1, wherein component (iii) is present in an amount of 1-3 wt. % by weight of components (i) and (ii).

10. The polymer blend material of claim 1, wherein the melt-stable sinapyl alcohol-rich hardwood lignin is derived from an organosolv process.

11. The polymer blend material of claim 1, wherein the melt-stable sinapyl alcohol-rich hardwood lignin is derived from a Kraft or soda process.

12. The polymer blend material of claim 1, wherein the polymer blend material has a tensile failure strength of at least 10 MPa and an elongation at break of 20%-100%.

13. The polymer blend material of claim 1, wherein the polymer blend material has a tensile failure strength of at least 10 MPa and an elongation at break of 20%-50%.

14. The polymer blend material of claim 1, wherein the melt-stable sinapyl alcohol-rich hardwood lignin component contains at least 60 wt % of syringyl (S) component relative to total lignin components.

15. A polymer blend material consisting of:
(i) a melt-stable sinapyl alcohol-rich hardwood lignin component containing at least 50 wt % of syringyl (S) component relative to total lignin components;
(ii) a nitrile butadiene rubber component having an acrylonitrile content of 40-55 mol %; and
(iii) zinc chloride;
wherein:
component (i) is present in an amount of about 50 wt % by weight of components (i) and (ii);
component (i) is dispersed in component (ii) in the form of domains, wherein at least 80% of the domains have a size of up to 200 nm;
component (iii) is present in an amount of 0.5-4 wt. % by weight of components (i) and (ii); and
the polymer blend material has a tensile failure strength of at least 10 MPa, and an elongation at break of at least 20%.

* * * * *